(12) United States Patent
Liu et al.

(10) Patent No.: US 10,887,600 B2
(45) Date of Patent: Jan. 5, 2021

(54) METHOD AND APPARATUS FOR PACKAGING AND STREAMING OF VIRTUAL REALITY (VR) MEDIA CONTENT

(71) Applicant: Samsung Electronics Co., Ltd., Suwon-si (KR)

(72) Inventors: Chenghao Liu, Frisco, TX (US); Imed Bouazizi, Frisco, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/898,848

(22) Filed: Feb. 19, 2018

(65) Prior Publication Data

US 2018/0270486 A1    Sep. 20, 2018

Related U.S. Application Data

(60) Provisional application No. 62/473,002, filed on Mar. 17, 2017.

(51) Int. Cl.
*H04N 7/12*    (2006.01)
*H04N 11/24*    (2006.01)
(Continued)

(52) U.S. Cl.
CPC ......... *H04N 19/146* (2014.11); *G06T 19/003* (2013.01); *H04L 65/604* (2013.01);
(Continued)

(58) Field of Classification Search
CPC ......... H04N 19/146; H04N 21/234363; H04N 21/23439; H04N 21/2365;
(Continued)

(56) References Cited

U.S. PATENT DOCUMENTS 5,521,720 A * 5/1996 Yoshida ............... G06T 3/40
358/296
2002/0021353 A1* 2/2002 DeNies ............ H04N 21/44222
348/36
(Continued)

FOREIGN PATENT DOCUMENTS

EP       2490179 A1    8/2012
JP    2016167699 A     9/2016
WO  2015192286 A1   12/2015

OTHER PUBLICATIONS

Zare, Alireza, et al., "HEVC-compliant Tile-based Streaming of Panoramic Video for Virtual Reality Applications", Proceedings of the 2016 ACM on Multimedia Conference, MM '16, Jan. 1, 2016, 5 pages (Year: 2016).*

(Continued)

*Primary Examiner* — Jessica M Prince

(57) ABSTRACT

An electronic device, a server and a method for packing and consuming video content are disclosed. The electronic device includes a sensor, a processor operably connected to the sensor, and a transceiver operably connected to the processor. The processor is configured to determine a current viewport for video content based on an output of the sensor. The transceiver is configured to request and receive a media stream including (i) a high-resolution video partition of the video content that covers the current viewport and (ii) a low-resolution version of the video content that is rotated relative to the video content. The processor is further configured to process the package to render at least one of the high-resolution video partition of the video content or the low-resolution version of the video content. The high-resolution video partition and the low-resolution video of the video content are packed together.

18 Claims, 13 Drawing Sheets

(51) Int. Cl.

| | |
|---|---|
| *H04N 5/265* | (2006.01) |
| *H04N 19/146* | (2014.01) |
| *G06T 19/00* | (2011.01) |
| *H04L 29/08* | (2006.01) |
| *H04N 5/262* | (2006.01) |
| *H04L 29/06* | (2006.01) |
| *H04N 21/2343* | (2011.01) |
| *H04N 21/434* | (2011.01) |
| *H04N 21/81* | (2011.01) |
| *H04N 21/2365* | (2011.01) |
| *H04N 21/414* | (2011.01) |

(52) U.S. Cl.
CPC ......... *H04L 67/322* (2013.01); *H04N 5/2628* (2013.01); *H04N 21/2365* (2013.01); *H04N 21/23439* (2013.01); *H04N 21/234363* (2013.01); *H04N 21/4347* (2013.01); *H04N 21/816* (2013.01); *H04L 67/38* (2013.01); *H04N 21/41407* (2013.01)

(58) Field of Classification Search
CPC ......... H04N 21/41407; H04N 21/4347; H04N 21/816; H04N 5/2628; G06T 9/00; G06T 19/003; H04L 65/604; H04L 67/322; H04L 67/38
See application file for complete search history.

(56) References Cited

U.S. PATENT DOCUMENTS

| | | | |
|---|---|---|---|
| 2012/0007866 A1 | 1/2012 | Tahan | |
| 2016/0260196 A1* | 9/2016 | Roimela | G06F 3/013 |
| 2017/0280126 A1* | 9/2017 | Van der Auwera | G06T 3/0056 |
| 2018/0077433 A1* | 3/2018 | Kudo | H04N 21/2365 |
| 2018/0098131 A1* | 4/2018 | Zhou | H04N 21/6373 |
| 2018/0167634 A1* | 6/2018 | Salmimaa | H04N 19/187 |
| 2019/0220955 A1* | 7/2019 | Kudo | G06T 7/11 |

OTHER PUBLICATIONS

ISA/KR, "International Search Report and Written Opinion of the International Searching Authority," International Application No. PCT/KR2018/003130, dated Jun. 26, 2018, 14 pages.
Rondao Alface et al., "Interactive Omnidirectional Video Delivery: A Bandwidth-Effective Approach", Bell Labs Technical Journal vol. 16, No. 4, Mar. 2012, pp. 135-147.
European Patent Office, "Supplementary European Search Report," Application No. 18767985.7, dated Dec. 9, 2019, 9 pages.
Zare, Alireza, et al., "HEVC-compliant Title-based Streaming of Panoramic Video for Virtual Reality Applications," Proceedings of the 2016 ACM on Multimedia Conference, MM '16, Jan. 1, 2016, 5 pages.

* cited by examiner

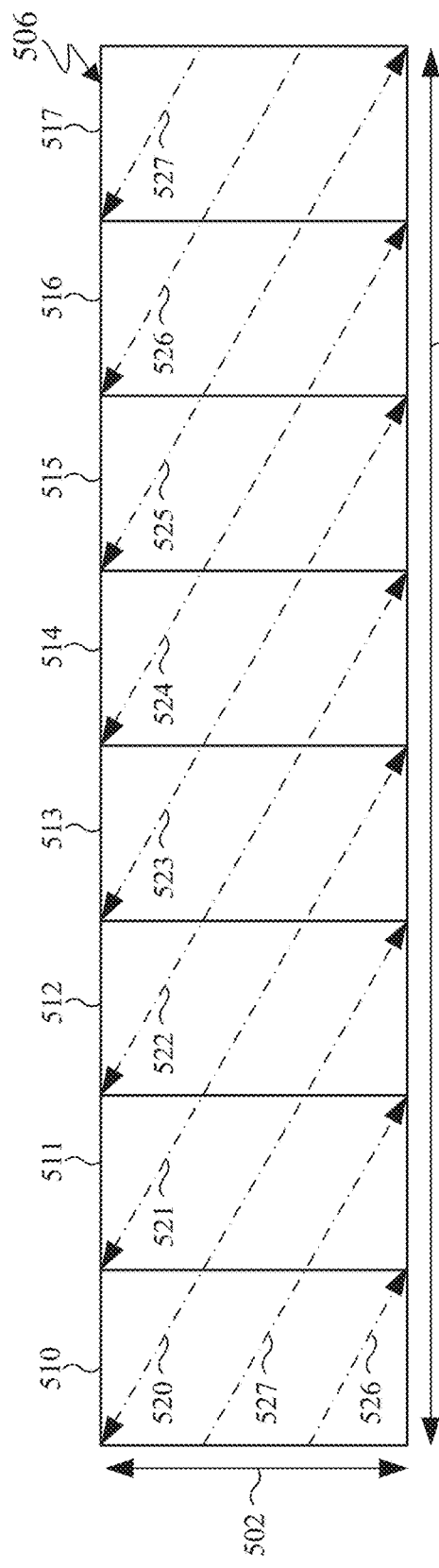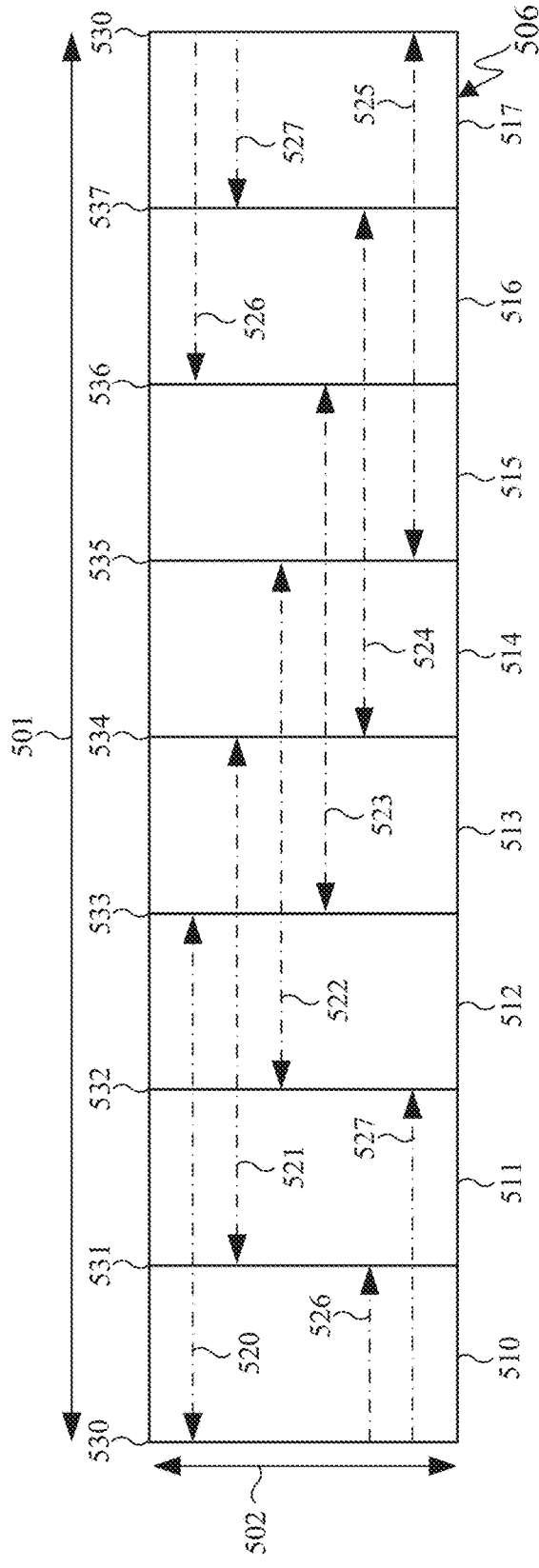

METHOD AND APPARATUS FOR PACKAGING AND STREAMING OF VIRTUAL REALITY (VR) MEDIA CONTENT

CROSS-REFERENCE TO RELATED APPLICATION AND CLAIM OF PRIORITY

This application claims priority under 35 U.S.C. § 119(e) to U.S. Provisional Patent Application No. 62/473,002 filed on Mar. 17, 2017. The above-identified provisional patent application is hereby incorporated by reference in its entirety.

TECHNICAL FIELD

This disclosure relates generally to virtual reality. More specifically, this disclosure relates to packaging virtual reality content to enable a higher rendered resolution content with reduced bandwidth.

BACKGROUND

Virtual reality experiences are becoming prominent. For example, 360° video is emerging as a new way of experiencing immersive video due to the ready availability of powerful handheld devices such as smartphones. With the development of VR-related technology, users may view 360° content by using various devices. User's viewing 360° content such as videos and images feel more immersed compared to when they view a planar image. 360° video enables immersive "real life," "being there" experience for consumers by capturing the 360° view of the world.

Users can interactively change their viewpoint and dynamically view any part of the captured scene they desire. Display and navigation sensors track head movement in real-time to determine the region of the 360° video that the user wants to view.

SUMMARY

This disclosure provides methods and apparatuses for packaging and streaming of virtual reality (VR) media content.

In one embodiment, an electronic device for consuming video content is provided. The electronic device includes a sensor, a processor operably connected to the sensor, and a transceiver operably connected to the processor. The processor is configured to determine a current viewport for video content based on an output of the sensor. The transceiver is configured to request and receive a media stream including (i) a high-resolution video partition of the video content that covers the current viewport and (ii) a low-resolution version of the video content that is rotated relative to the video content. The processor is further configured to process the package to render at least one of the high-resolution video partition of the video content or the low-resolution version of the video content. The high-resolution video partition and the low-resolution video of the video content are packed together.

In another embodiment, a server for packing viewport-dependent content is provided. The server includes a communication interface; and a processor operably connected to the communication interface. The processor is configured to partition high-resolution video content into a plurality of overlapping high-resolution video partitions, each of the partitions cover a viewport for the video content. The processor is configured to generate a low-resolution version of the video content that is rotated relative to the video content. The processor is configured to generate a media stream by packing one of the high-resolution video partitions and the rotated low-resolution version of the video content.

In yet another embodiment, a method for consuming video content at an electronic device is provided. The method includes determining a current viewport for video content based on an output of a sensor of the electronic device. The method includes requesting and receiving a media stream including (i) a high-resolution video partition of the video content that covers the current viewport and (ii) a low-resolution version of the video content that is rotated relative to the video content. Additionally, the method includes processing the media stream to render at least one of the high-resolution video partition of the video content or the low-resolution version of the video content. The high-resolution video partition and the low resolution version of the video content are packed together.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5B and 5C illustrates an example for partitioning a Field-of-View VR content in accordance with an embodiment of this disclosure;

DETAILED DESCRIPTION

Figure 1:
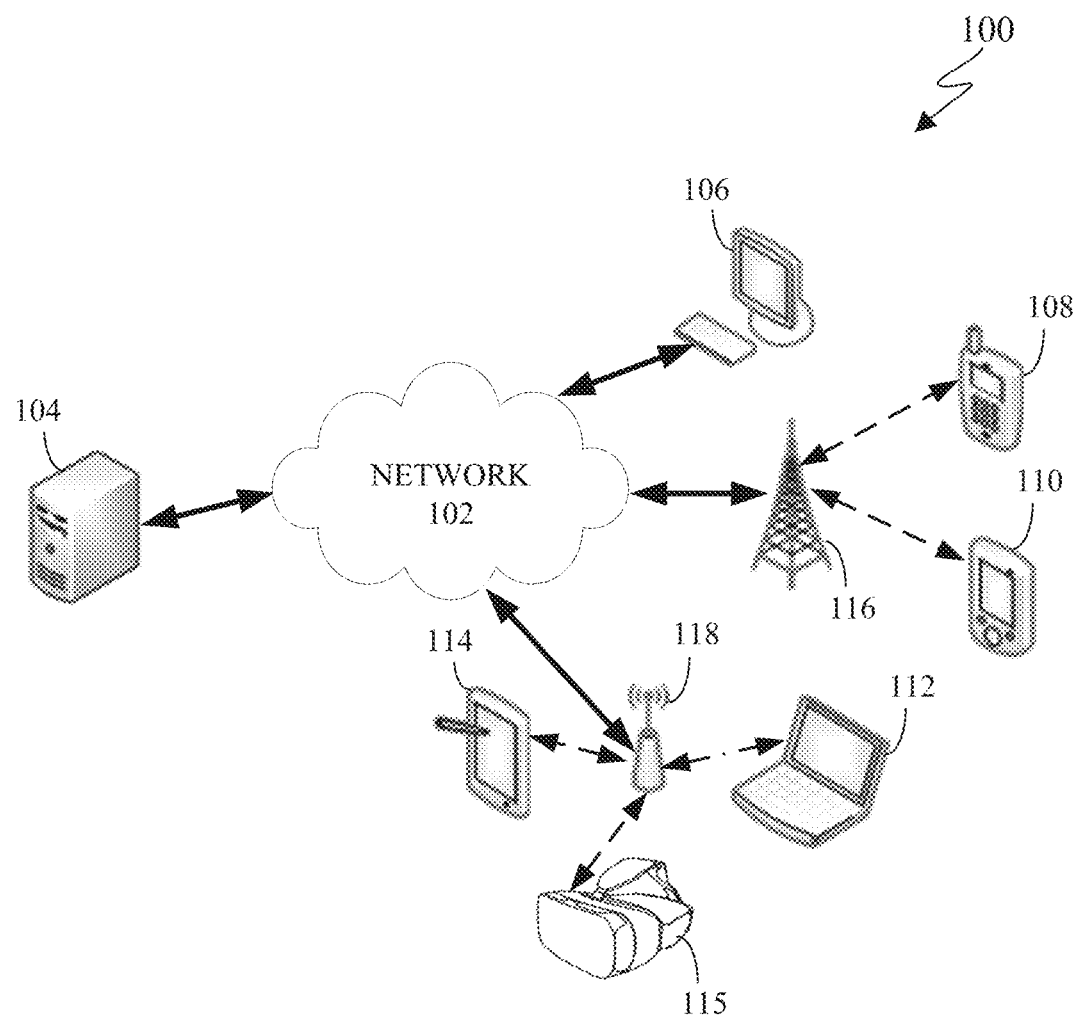
FIG. 1 illustrates an example communication system in accordance with embodiments of the present disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual and audio scene on a display or a headset. The rendering is designed to mimic the visual and audio sensory stimuli of the real world as naturally as possible to an observer or user as they move within the limits defined by the application. For example, VR places a user into immersive worlds that interact with their head movements. At the video level, VR is achieved by providing a video experience that covers as much of the field-of-view (FOV) as possible together with the synchronization of the viewing angle of the rendered video with the head movements. Although many different types of devices are able to provide such an experience, head mounted displays are the most popular. Typically head mounted displays rely either on dedicated screens integrated into the device and running with external computers (tethered) or on a smartphone inserted into the head mounted display (untethered). The first approach utilizes lightweight screens and benefiting from a high computing capacity. In contrast the smartphone-based systems, utilizes a higher mobility and can be less expensive to produce. In both instances, the video experience is generated the same.

The VR content can include a high quality omnidirectional 360° media scene. For example, high quality can include 1080p resolution, 4K resolution or higher. The omnidirectional 360° media scene can include images, video, and content of audiovisual simulation of an altered, augmented or substituted environment that surrounds the user, thereby allowing the user to look around in all directions, just as a person (and the user) can do in real life. The content can be live, previously captured video, as well as computer generated content. 360° VR content is an immersive spherical video mapped into three-dimensional geometry, such as a sphere. The VR video enables a user to look around during playback. For example, a user can look around the VR content via a dedicated VR head mounted display.

VR content can be represented in different formats, such as panoramas or spheres, depending on the capabilities of the capture systems. For example, the content can be captured from real life or computer generated or a combination thereof. Events captured to video from the real world often require multiple (two or more) cameras to record the surrounding environment. While this kind of VR can be rigged by multiple individuals using numerous like cameras, it takes two cameras per view to create depth. In another example, content can be generated by a computer such as computer generated images (CGI). In another example, combination of real world content with CGI is known as augmented reality.

Many systems capture spherical videos covering a 360°× 180° view a 360°×360°, and the like. A 360°×180° view is represented as a view of a half sphere. For example, a 360°×180° view is a rendered view of a top half of a sphere where the viewer can view 360° in the horizontal plane and 180° vertical view plane. A 360°×360° view is represented as a complete spherical rendering, covering a full sphere. For example, a 360°×360° view can be generated by stitching two 360°×180° views together to yield a single video or image covering an entire 360° view. Capturing content within a 360°×180° view is typically performed by multiple cameras. Various camera configurations can be used for recording two-dimensional and three-dimensional content. The captured views from each camera are stitched together to combine the individual views of the omnidirectional camera systems to a single panorama or sphere. The stitching process typically avoids parallax errors and visible transitions between each of the single views.

As used herein after VR content and VR video includes omnidirectional 360° media scene, as discussed above. For example, VR content and VR video places the viewer in an immersive environment that allows a user to interact and view different regions of the environment based on their head movements, as discussed above.

Equirectangular projection (ERP) is an image projection technique commonly used for VR content. ERP can apply a certain distortion to a panorama image enabling the image to be displayed correctly when the image is projected inside a sphere. For example, during an ERP projection the horizontal and vertical coordinates simply correspond to longitude and latitude, respectively, with no transformation or scaling applied. After the projection, the obtained two-dimensional rectangular image can be partitioned into regions that can be rearranged to generate "packed" frames.

High resolution and low resolution can be distinguished by the number of pixels utilized on a display. In identifying the number of pixels on a display, the following notation is commonly used 'horizontal pixels×vertical pixels.' That is, the number of pixels along a horizontal line, but the number of vertical lines on the display. For example, high definition resolution is identified by a resolution of 1,920×1,080 (horizontal pixels×vertical pixels). Ultra HD (UHD) is identified by a resolution of 3,840×2,160. 4K is identified by a resolution of 4096×2160. Greater resolutions are possible such as 6K and 8K, and so forth. It is noted that example resolutions as discussed herein are for examples only and are not intended to limit the disclosure.

In order to provide higher rendered resolution content a packaging implementation is needed to transmit high quality content while reducing processing and buffering delays. VR content traditionally have lower resolutions compared to traditional two-dimensional displays, due to challenges to transmit high quality images through limited bandwidth. The limited bandwidth can be caused by constraints on the display device, such as a wireless VR head mounted display. For example, a wireless VR head mounted display can have a bitrate requirement. Currently 4K video resolutions are used as a functional minimum resolution for wireless VR head mounted display with higher resolutions being sought, such as 6K or higher. Therefore, the bandwidth requirements to transmit such resolutions to a wireless VR head mounted display are increasing. In order to provide higher rendered resolution content a packaging implementation method and apparatus are provided to perform efficient VR streaming. For example, embodiments of the present disclosure provide FOV dependent VR delivery. To provide an immersive experience while reducing the overall bandwidth, due to higher resolution content, a low motion-to-photon delay is utilized.

According to embodiments of the present disclosure, packaging techniques for streaming VR 360° video or wide angle video content are provided. The VR 360° video or wide angle video content is partitioned into overlapping partitions. The 360° video or wide angle video can be a high quality ERP, such as 4K resolution. Each overlapping partition is referred to as a tile. Thereafter the high quality ERP is down-sampled to a low quality ERP covering the whole 360° video or wide angle video ERP representation. In certain embodiments, the high quality ERP is spatially down-sampled. In order to efficiently package the content, when down-sampling the high quality ERP to the low quality ERP, the low quality ERP is scaled so that the horizontal resolution of the low quality ERP is similar to the vertical resolution of the high quality ERP. Thereafter, the low quality ERP is rotated 90 degrees. Each partitioned high quality ERP is packaged with the rotated low quality ERP. The resulting package is a partitioned segment of the high quality ERP coupled with a rotated low quality ERP. That is the high quality ERP is a segment of the 360° video or wide angle video, while the low quality ERP is the whole 360° video or wide angle video.

According to embodiments of the present disclosure, multiple FOV video sequences are encoded to produce multiple versions of the FOV video streams. A server dynamically sends FOV video stream according to the user's viewing direction on an electronic device, such as a head mounted display. The electronic device receives the FOV video stream dynamically. The electronic device decodes and plays only one FOV video stream and renders the portion of the texture that corresponds to the current viewport. The electronic device prioritizes rendering from the high quality tile and only uses the low quality texture to render areas that are not covered by the received high quality tile texture.

According to embodiments of the present disclosure, by partitioning high quality VR content as well as down-sampling the VR content the transmission utilizes less bandwidth than sending the entire high quality VR content. Additionally, by transmitting only a single partition of the high quality VR content, the electronic device that displays the content can avoid decoding and synchronizing multiple video streams. Further, the server can send only one or more FOV video streams over a time period to provide specific viewing oriented directions such as a FOV VR streaming.

FIG. 1 illustrates an example computing system 100 according to this disclosure. The embodiment of the system 100 shown in FIG. 1 is for illustration only. Other embodiments of the system 100 can be used without departing from the scope of this disclosure.

The system 100 includes network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between a server 104 and various client devices 106-115. The client devices 106-115 may be, for example, a smartphone, a tablet computer, a laptop, a personal computer, a wearable device, or a head-mounted display (HMD). The server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102. As described in more detail below, the server 104 transmits the 360° VR video content one or more users.

Each client device 106-115 represents any suitable computing or processing device that interacts with at least one server or other computing device(s) over the network 102. In this example, the client devices 106-115 include a desktop computer 106, a mobile telephone or mobile device 108 (such as a smartphone), a personal digital assistant (PDA) 110, a laptop computer 112, a tablet computer 114, and a HMD 115. However, any other or additional client devices could be used in the system 100.

In this example, some client devices 108-115 communicate indirectly with the network 102. For example, the client devices 108 and 110 (mobile devices 108 and PDA 110, respectively) communicate via one or more base stations 116, such as cellular base stations or eNodeBs (eNBs). Mobile device 108 includes smartphones. Smartphones represent a class of mobile devices 108 that are a handheld device with a mobile operating system and an integrated mobile broadband cellular network connection for voice, short message service (SMS), and internet data communication. Also, the client devices 112, 114, and 115 (laptop computer 112, tablet computer 114 and head mounted display (HMD) 115, respectively) communicate via one or more wireless access points 118, such as IEEE 802.11 wireless access points. As described in more detail below the HMD 115 can display a 360° video to one or more users. Note that these are for illustration only and that each client device 106-115 could communicate directly with the network 102 or indirectly with the network 102 via any suitable intermediate device(s) or network(s).

In certain embodiments, the mobile device 108 (or any other client device 106-115) can transmit information securely and efficiently to another device, such as, for example, the server 104. The mobile device 108 (or any other client device 106-115) can function as a VR display when attached to a headset and can function similar to HMD 115. The mobile device 108 (or any other client device 106-115) can trigger the information transmission between itself and server 104.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide timed content within a 360° VR environment. In certain embodiments, client devices 106-115 display VR content and video in an undistorted manner. For example, the server 104 packages VR content. Each package can be based on a FOV of the user as determined by the client device 106-115. The server 104 can then transmit the VR video data to client devices 106-115. The client device 106-115 then renders the VR content.

Figure 2:
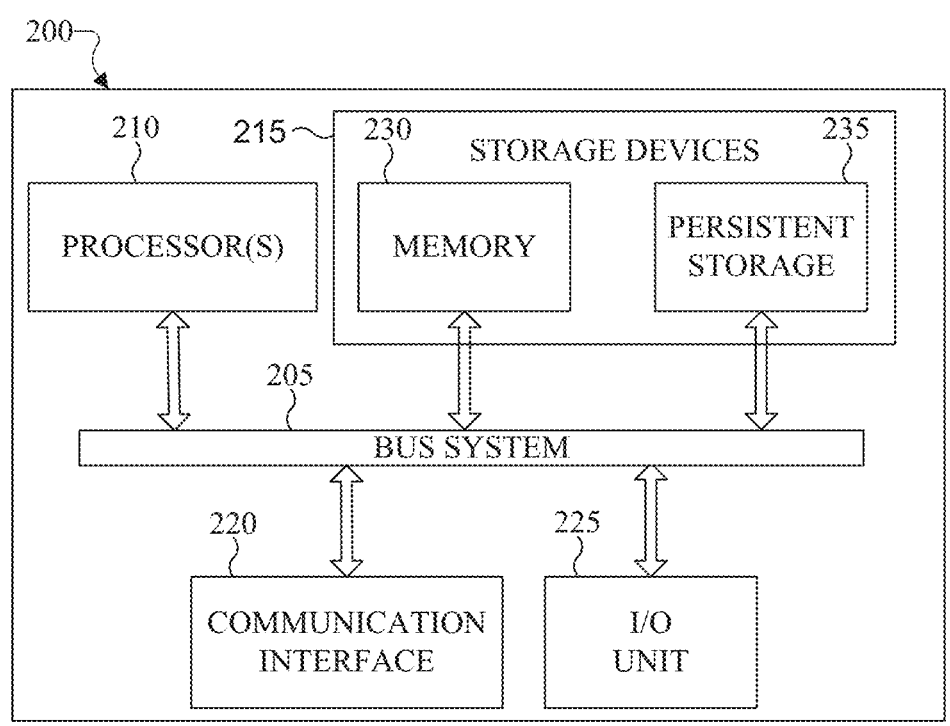
FIG. 2 illustrates an example server in accordance with an embodiment of this disclosure.
Figure 3:
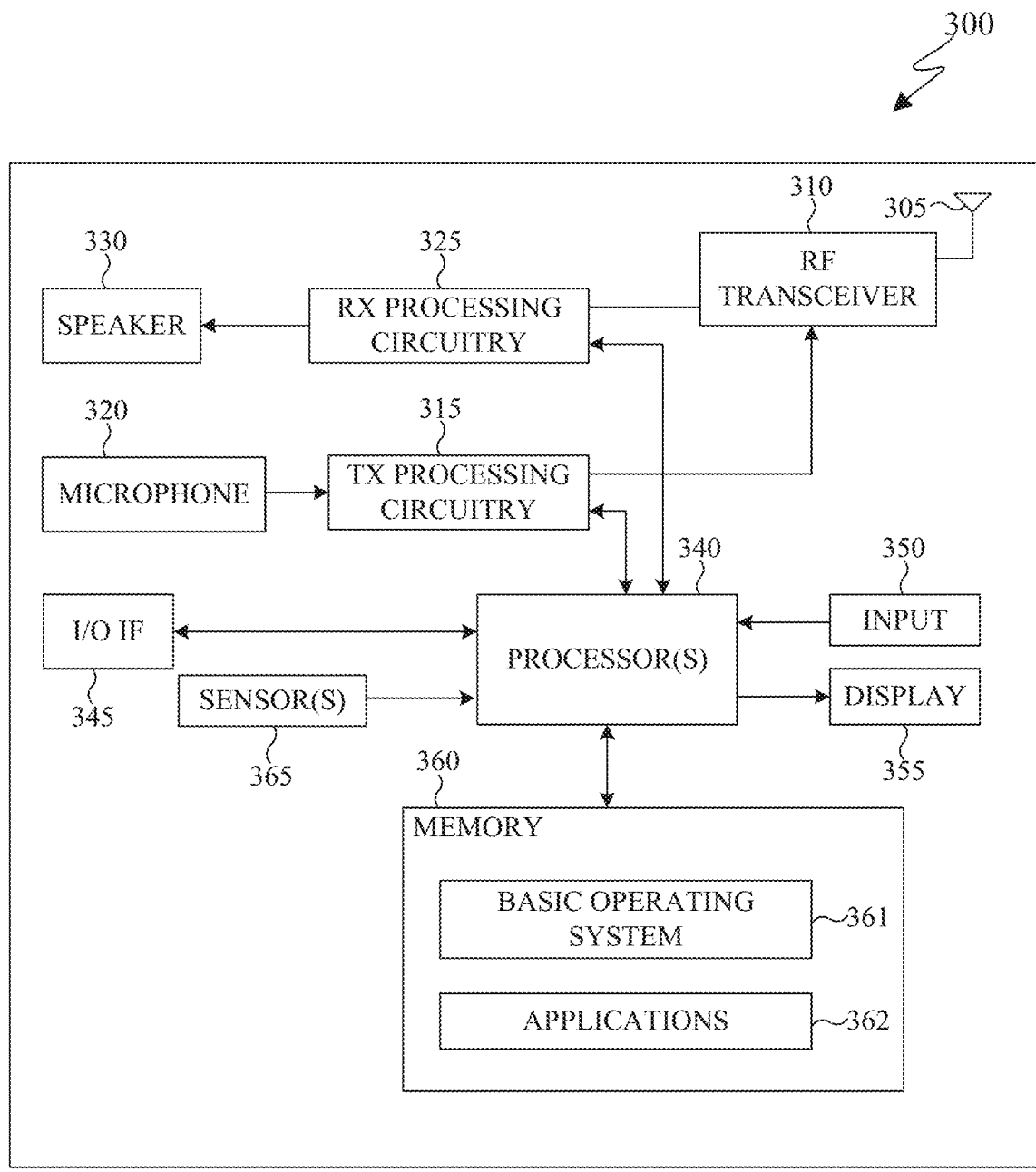
FIG. 3 illustrates an example electronic device in accordance with an embodiment of this disclosure.

FIGS. 2 and 3 illustrate example devices in a computing system in accordance with an embodiment of this disclosure. In particular, FIG. 2 illustrates an example server 200, and FIG. 3 illustrates an example electronic device 300. The server 200 could represent the server 104 of FIG. 1, and the electronic device 300 could represent one or more of the client devices 106-115 of FIG. 1.

Server 200 can represent one or more local servers, one or more omnidirectional video servers, one or more VR streaming servers, and the like. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The instructions stored in memory 230 can include instructions for partitioning and down-sampling VR content. The instructions stored in memory 230 can also include instructions for packaging each high quality partitioned segment with the down-sampled (low quality) VR content. The instructions stored in memory 230 can also include instructions for rendering the 360° scene on a client device 106-115. For example, the instructions for rendering the 360° scene can include prioritizing the high quality segment over the low quality video. For instance, if the high quality segment does not cover a current viewport of the user, the instructions can notify the display device (such as a client device 106-115) to render the low quality video while the high quality segment is transmitted. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, motion sensors, or other suitable input device. The I/O unit 225 can also send output to a display, printer, or other suitable output device.

In certain embodiments, server 200 implements the partitioning and packaging of the VR content. In certain embodiments, server 200 partitions high quality VR content into multiple overlapping segments. The server 200 can then down-sample (or compress) the high quality VR content (the whole content, not each individual segments). Thereafter the server 200 then packages each high quality VR content segment with the down-sampled VR content of the whole VR video. Each package can then be transmitted through the communication interface 220 to a client device such as client device 106-115 where the client device renders and displays the VR content to a user to view.

Note that while FIG. 2 is described as representing the server 104 of FIG. 1, the same or similar structure could be used in one or more of the various client devices 106-115. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the client devices 106-115 of FIG. 1 can include the same or similar configuration as electronic device 300.

In certain embodiments, electronic device 300 is useable with data transfer and media playing applications. The electronic device 300 can be a mobile communication and display device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114 of FIG. 1), a head mounted display (similar to HMD 115 of FIG. 1), and the like.

As shown in FIG. 3, the electronic device 300 includes an antenna 305, a radio frequency (RF) transceiver 310, a transmit (TX) processing circuitry 315, a microphone 320, and a receive (RX) processing circuitry 325. The electronic device 300 also includes a speaker 330, a one or more processors 340, an input/output (I/O) interface (IF) 345, an input 350, a display 355, and a memory 360. The memory 360 includes a basic operating system (OS) 361 and one or more applications 362.

The RF transceiver 310 receives, from the antenna 305, an incoming RF signal transmitted by another component on a system. For example, the RF transceiver 310 receives RF signal transmitted by a BLUETOOTH or WI-FI signal from an access point (such as a base station, Wi-Fi router, Bluetooth device) of the network 102 (such as a WI-FI, BLUETOOTH, cellular, 5G, LTE, LTE-A, WiMAX, or any other type of wireless network). The RF transceiver 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 is also capable of executing other applications 362 resident in the memory 360, such as, partitioning VR content, down-sampling VR content, packaging VR content, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-115, server 104 or server 200. The I/O interface 345 is the communication path between these accessories and the processor 340.

The processor 340 is also coupled to the input 350. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. In another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. For example, in the capacitive scheme, the input 350 can recognize touch or proximity. The input 350 can also include a control circuit. Input 350 can be associated with sensor(s) 365 and/or a camera by providing additional input to processor 340. For example, the input 350 can be associated with motion sensors (similar to sensor 365) to determine an input based on movement of the electronic device 300. As discussed in greater detail below, sensor 365 includes inertial sensors (such as, accelerometers, gyroscope, and magnetometer), optical sensors, motion sensors, cameras, pressure sensors, heart rate sensors, altimeter, and the like.

The processor 340 is also coupled to the display 355. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like. Display 355 can be sized to fit within a HMD. Display 355 can be a singular display screen or multiple display screens capable of creating a stereoscopic display. In certain embodiments, display 355 is a heads up display (HUD).

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc.

Electronic device 300 can further include one or more sensors 365 that meter a physical quantity or detect an activation state of the electronic device 300 and convert metered or detected information into an electrical signal. For example, sensor(s) 365 may include one or more buttons for touch input (located on the headset or the electronic device 300), one or more cameras, a gesture sensor, an eye tracking sensor, a gyroscope or gyro sensor, an air pressure sensor, a magnetic sensor or magnetometer, an acceleration sensor or accelerometer, a grip sensor, a proximity sensor, a color sensor (such as a Red Green Blue (RGB) sensor), a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor(s) 365 can further include a control circuit for controlling at least one of the sensors included therein. As will be discussed in greater detail below, one or more of these sensor(s) 365 may be used to control a user interface (UI), detect UI inputs, determine the orientation and facing direction of the user for three-dimensional content display identification, etc. Any of these sensor(s) 365 may be located within the electronic device 300, within a headset configured to hold the electronic device 300, or in a singular device where the electronic device 300 includes a headset.

As will be discussed in greater detail below, in this illustrative embodiment, electronic device 300 receives a signal that containing omnidirectional 360° VR video data that includes both high quality and low quality content. High quality and low quality content can be distinguished based on the resolution of the content. In certain embodiments, the electronic device displays VR content based on the current FOV of the user. In certain embodiments, the electronic device 300 can prioritize the high quality VR content over the low quality VR content when the available high quality VR content is unavailable for the current FOV of the user.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
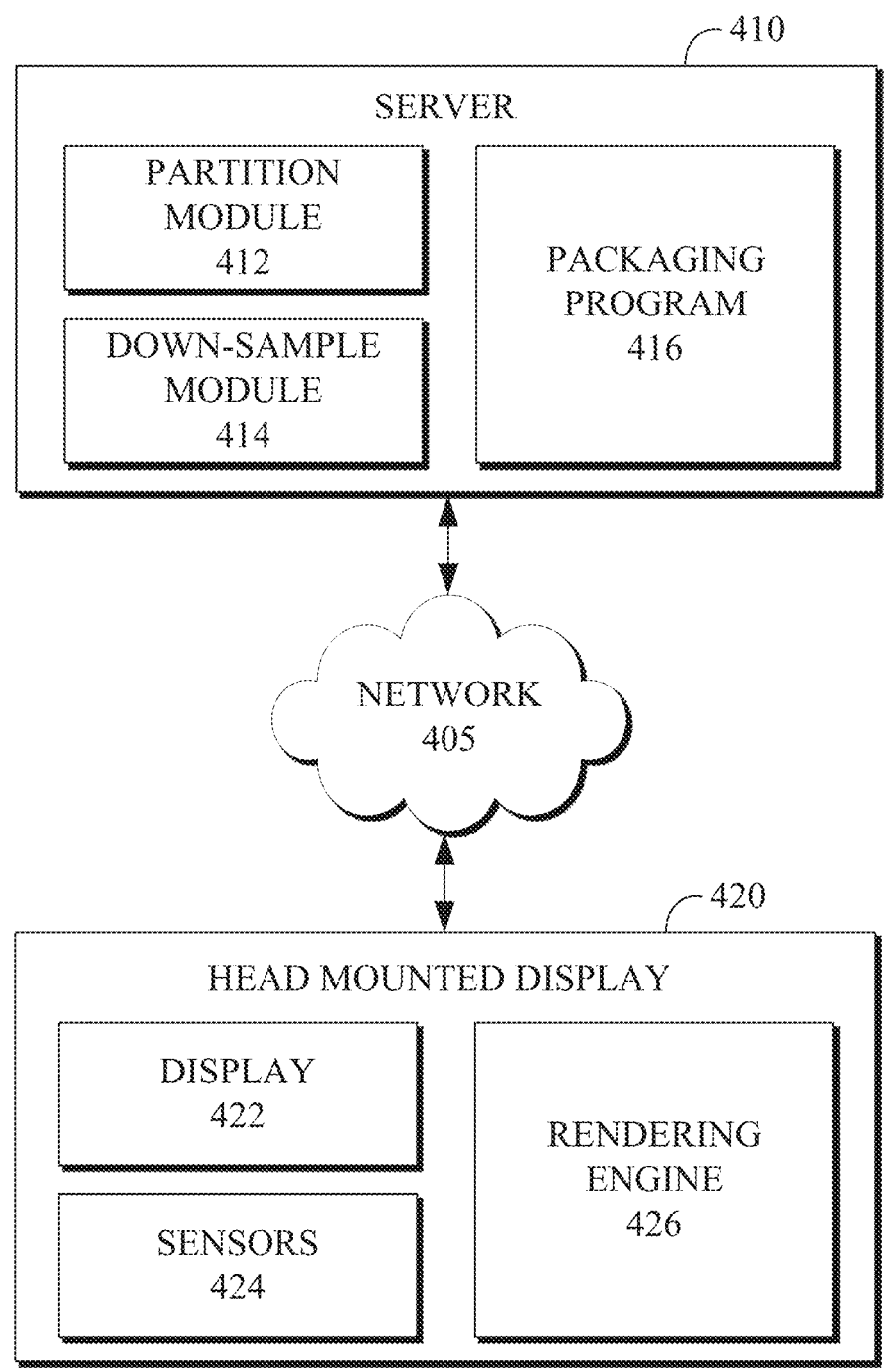
FIG. 4 illustrates an example block diagram in accordance with an embodiment of this disclosure.

FIG. 4 illustrates an example block diagram of a communication system in accordance with an embodiment of this disclosure. The communication system 400 includes a server 410 and a head mounted display (HMD) 420 in communication over network 405. Communication system 400 illustrates a high-level overview of an embodiment of the present disclosure of a server 410 that can package VR content, such as omnidirectional 360° video, and transmit the package over network 405 to the HMD 420. The HMD 420 can display VR content. The embodiment of the communication system 400 shown in FIG. 4 is for illustration only. Other embodiments could be used without departing from the scope of the present disclosure.

Network 405 can be configured similar to network 102 of FIG. 1. Server 410 can be configured similar to server 104 of FIG. 1 and can include internal components similar to that of server 200 of FIG. 2. HMD 420 can be configured similar to any of the one or more client devices 106-115 of FIG. 1, and can include internal components similar to that of electronic device 300 of FIG. 3. In certain embodiments, the HMD 420 is not limited to a head mounted display device. For example, HMD 420 can be a smart phone (similar to mobile device 108 of FIG. 1), a laptop computer (similar to laptop computer 112 of FIG. 1), a desktop computer (similar to desktop computer 106 of FIG. 1), a tablet computer (similar to tablet computer 114 of FIG. 1), and the like.

Network 405 is be used to provide communication between the server 410 to the HMD 420. Network 405 can be personal area network (PAN), Local Area Networks (LANs), Wireless Local Area Networks (WLANs), the Internet, the Public Switched Telephone Network (PSTN), as well as other wireless networks. Network 405 may also be the Internet representing a worldwide collection of networks and gateways that use Transmission Control Protocol/Internet Protocol (TCP/IP) protocols to communicate with one another. Network 405 includes a cable, a router, switches a firewall, or a combination thereof. Network 405 can include a variety of connections, such as, wired, wireless or fiber optic connections.

Server 410 packages VR content. In certain embodiments, server 410 can be associated with one or more servers that provide the multimedia data and the timed text data. For example, server 410 receives VR content that includes a high resolution omnidirectional 360° video. The server then adapts VR content in order for the content to be transmitted over network 405 using minimal band width in a manner that requires minimal processing by the display device, when the VR content is rendered for display to a user.

Server 410 can be a web server, a server computer such as a management server, or any other electronic computing system capable of sending and receiving data. In certain embodiments, server 410 is a "cloud" of computers interconnected by one or more networks, where server 410 is a computing system utilizing clustered computers and components to act as a single pool of seamless resources when accessed through network 405. Server 410 includes a partition module 412, down-sample module 414, and a packaging program 416. In certain embodiments, the partition module 412, the down-sample module 414, and the packaging program 416 are a single element. For explanatory purposes the elements are broken up into independent components.

Partition module 412 partitions VR video content into multiple overlapping segments. In certain embodiments, the partition module 412 partitions high quality VR content to produce multiple overlapping partitions. Each partition segment is denoted as a tile. In certain embodiments, the VR content is an ERP of a 360° video. In certain embodiments, the VR content is a wide angle video. Each segment is a particular viewing orientation.

Partition module 412 vertically partitions the VR content. In a certain embodiment, the VR content is vertically partitioned into eight partitions of equal size. Each partition overlaps the previous and the subsequent partitioned segment. For example, for a given 360° content, the width of each segment is 135°. Each 135° segment overlaps the adjacent segments by 45°. That is, each partition covers a 135° width of the VR content, and the gaps between the two adjacent partitions together equal to 45°, and the FOV is 90°. In another example, the FOV is 45°, and each partition is 45° to yield the 135° segment. Each 135° segment can represent one of eight field of view images associated with a particular VR content. In certain embodiments, each segment can be larger or smaller than 135°. Similarly, the gaps between the two adjacent partitions can be larger or smaller than 45°. Additional description associated partitioning VR content is discussed below with reference to FIGS. 5A, 5B, and 5C.

Down-sample module 414 down-samples the entire VR content. Down-sampling is the process of changing the resolution of an image of video from its original size to a lower resolution. Down-sampling module 414, scales the VR content to a lower resolution. Performing a down-sampling decreases the size of the content. Depending on the amount the resolution of a down-sampled content is lowered, the content can appear pixelated, blocky, less colorful, and the like.

In certain embodiments, down-sample module 414 spatially down-samples the VR content into a low resolution VR content covering the whole 360° or wide view video ERP. The resulting content is the entirety of the VR content but at a lower resolution, than the original resolution. That is, the down-sampled video content is a lower resolution version of VR content that was partitioned by the partition module 412. Each individual partition segment is not down-sampled, rather the entire VR content is down-sampled. For example, if the original resolution is 4K, then down-sampled version can be 2K. In another example, if the original resolution is 4K, then down-sampled version can be 1080p.

In certain embodiments, down-sample module 414 when down-sampling the high resolution VR content is does not lower the resolution by a certain amount. Rather, the down-sample module 414 when down-sampling the high resolution VR content, scales the down-sampling based on the resolution size of the original high resolution VR content. For example, when the down-sample module 414 reduces the resolution of the high resolution VR content, the down-sample can scale and down-sample the content to a resolution that is dependent on the resolution of the high resolution content. For instance, if the resolution of the high resolution video is 4096×2160 (4K resolution), down-sample module 414, lowers the resolution such that the horizontal resolution is approximately the same as the vertical resolution of high resolution content. Therefore, if the high resolution content is 4096×2160, then the low resolution content is 2160× vertical resolution that maintains a similar aspect ratio. An aspect ratio of an image describes the proportional relationship between its width and its height. For example, no matter how big or small the image is, if the width is divided into x units of equal length and the height is measured using this same length unit, the height will be measured to be y units.

In certain embodiments, when down-sample module 414, down-samples VR content, the low resolution version is half the resolution horizontally and vertically compared to the high resolution version of the VR content. In certain embodiments, when down-sample module 414, down-samples VR content, the horizontal resolution of the low resolution version is a similar resolution to that of the vertical resolution of the high resolution VR content. Additional description associated down-sampling VR content is discussed below with reference to FIG. 6.

Packaging program 416 packages each partitioned segment (from the partition module 412) with the down-sampled VR content (from the down-sample module 414). Packaging program 416 packages the high resolution video partition with the whole low resolution video to create a viewing-direction oriented multiple frame-packed streams. Each individual package, created by the packaging program 416, is a single FOV of the high quality VR content, coupled with the down-sampled entire VR content. This way, multiple frame packed VR content, can be transmitted individually, where each package is for a certain viewing direction. If partition module 412 partitions the high resolution VR content into eight separate partitions, then packaging program 416 packages each of the eight segments with the down-sampled VR content. When packaging program 416 packages each of the eight segments with the down-sampled VR content, 8 separate high resolutions FOV are generated for a VR sequence. Each of the eight FOV packages are designated for a certain direction of viewing. In certain embodiments, each FOV package is identified with an index number. For example, the index number can range for zero to seven.

In certain embodiments, packaging program 416 packages a single partition of the high resolution VR content with the down-sampled VR content, where the down-sampled VR content is rotated 90 degrees. The down-sampled VR content is rotated 90 degrees so that the horizontal resolution of the low resolution version is a similar resolution to that of the vertical resolution of the high resolution VR content. By matching the horizontal resolution of the low resolution version to that of the vertical resolution of the high resolution, creates a single package of uniform height and width to be transmitted with no wasted information. When packaging the VR content, the vertical resolution is defined by the high quality VR content.

In certain embodiments, the packaging program 416 includes a guard band to separate the low resolution content from the high resolution segment. A guard band can be an unused portion of the package that separates the two portions to prevent interference and cross bleeding from the high resolution content and the low resolution content, when the content is rendered on the display device, such as the HMD 420. In certain embodiments, the guard band is signaled as part of the content and the location of the guard band is known by the display device, such as the HMD 420.

In certain embodiments, packaging program 416 encodes the multiple FOV video sequences to produce multiple versions of the FOV video streams. The server 410 can then transmit a specific the FOV video streams according to a received request from a display device, such as HMD 420. Additional description associated packaging the VR content is discussed below with reference to FIGS. 7A and 7B.

Once packaging program 416 packages and compiles the individual FOV video segments, one or more FOV video segments can be transmitted to HMD 420 through network 405. In certain embodiments, the omnidirectional 360° video can be streaming from the server 410 to the HMD 420.

In certain embodiments, packaging program 416 encodes each package of the low resolution and the segmented high resolution with advanced video coding (AVC), High Efficiency Video Coding (HEVC), and the like. AVC is a type of standard for the compression of digital video. AVC is part of the MPEG and is a block oriented motion-compensation-based video compression standard. For example, AVC is a coding standard that provides good quality video at lower bitrates without increasing complexity of the design. HEVC is also a video compression standard, used in MPEG video formatting. HEVC offers approximately double the data compression ratio at the same level of video quality, or substantially improved video quality at the same bit rate as compared to AVC. For example, HEVC can support resolution s up to 8912×4320 and can include 8 k resolution. Generally, AVC and HEVC encoding compare different parts of a frame of video to find areas that are redundant, both within a single frame as well as subsequent frames. The redundant areas can then be replaced with a short description instead of the original pixels. It is noted that packaging program 416 is not limited to either AVC or HEVC, as AVC and HEVC are used herein for example, purposes only.

In certain embodiments, HMD 420 is a mobile phone (similar to mobile device 108 of FIG. 1). In certain embodiments, HMD 420 is a computer device similar to a desktop computer (similar to desktop computer 106 of FIG. 1), a laptop computer (similar to laptop computer 112 of FIG. 1), or a tablet computer (similar to tablet computer 114 of FIG. 1). In certain embodiments, HMD 420 is a head mounted display (similar to HMD 115 of FIG. 1) and worn by the user.

HMD 420 renders and displays VR content onto a display for a user to view. HMD 420 is a device capable of displaying content, such as images, videos, and text, through a graphical user interface (GUI), such as display 422. In certain embodiments, HMD 420 is capable of displaying VR, augmented reality (AR) and mixed media reality to a user. For example, the HMD 420 can completely replace the FOV of a user with a display depicting a set of received simulated visual component. The head mounted display can also include headphones to provide the user with the accompanying audio. In certain embodiments, HMD 420 is a stereoscopic display. HMD 420 includes a display 422, one or more sensors 424, and rendering engine 426.

Display 422 is similar to display 355 of FIG. 3. In certain embodiments, display 422 is a single display and affixed to the HMD 420. For example, display 422 is similar to a display screen on mobile device, or a display screen on a computer or tablet. In certain embodiments, display 422 is a display on mobile device and the mobile device (including the display) is affixed to a head mounted display. Once affixed to a head mounted display, the display 422 and can project VR, AR, and the like. In certain embodiments, display 422 is a stereoscopic display. Stereoscopic display is a display capable of conveying depth perception to a user.

Sensors 424 are similar to sensor 365 of FIG. 3. Sensors 424 provide for head and motion tracking of the user based on the position of the head. By tracking the motion of the motion of the head of the user, allows the rendering engine 426 to simulated visual and audio components in order to ensure that, from the user's perspective, items and sound sources remain consistent with the user's movements.

Rendering engine 426 is associated with rendering program 46. Rendering engine 426 enables a single stream parsing, decoding, and rendering process at the electronic device to support view-dependent VR streaming. Rendering engine decodes, playbacks only one FOV video stream and renders only one FOV video texture at a certain time instant. For example, the rendering engine 426 analyzes the received VR content, decodes the content. In certain embodiments, decoding the content includes separating the high resolution video segment from the low resolution video. Once decoded, the rendering engine 426 can play one FOV video stream and renders the portion of the texture that corresponds to the current viewport. The current viewport is the location of the VR content that the user is viewing.

In certain embodiments, the rendering engine 426 prioritizes rendering the high resolution VR content segment over the low resolution VR content. The rendering engine 426 uses the low resolution VR content texture to render areas that are not covered by the received high resolution texture. For example, if the current view port is not part of the high resolution segment, the low resolution VR content is rendered and displayed while the next package containing the high resolution VR content segment is requested by the HMD 420, transmitted by the server 410, and received by the HMD 420.

Figure 5A:
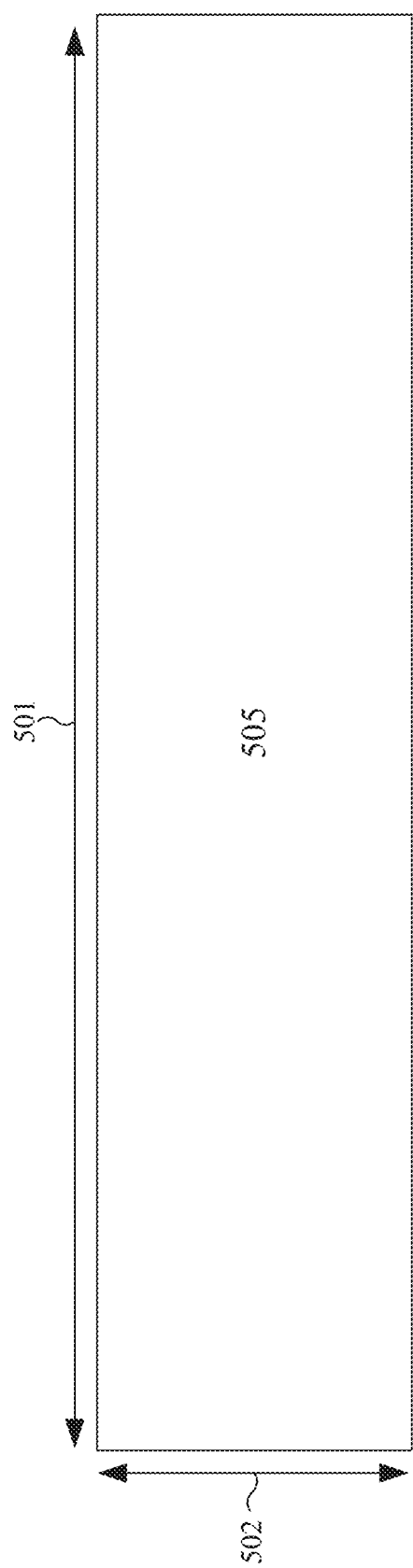
FIG. 5A illustrates an example virtual reality (VR) content in accordance with an embodiment of this disclosure

FIG. 5 illustrates an example high resolution VR content in accordance with an embodiment of this disclosure. FIGS. 5B and 5C illustrates an example for partitioning a FOV VR content in accordance with an embodiment of this disclosure. FIGS. 5B and 5C illustrate the partitioning of the high resolution VR content of FIG. 5A. FIGS. 5B and 5C depict different representations of the partitioning of the VR content. For example, each overlapping segments 520, 521, 522, 523, 524, 525, 526, and 527 are illustrated differently to clearly indicate each segment. The embodiment and depictions of FIGS. 5A, 5B and 5C are for illustration only. Other embodiments could be used without departing from the scope of the present disclosure.

FIG. 5A illustrates VR content 505. VR content 505 is an omnidirectional 360° spherical content presented in a rectangular form. For example, the VR content 505 allows a user to feel immersed in the content by changing the images displayed to the user in real-time (based on sensors in a head mounted display that track the head movement of the user), thereby allowing a user to view any portion of a 360° video that the user wants to view. That is, VR content 506 is multimedia content that encompasses a 360° view that surrounds a user allowing the user to look in all directions similar to a real life experience. In certain embodiments, the VR content 505 is spherical. In certain embodiments, the VR content is rectangular such as a ERP of spherical content. For example, the VR content 505 is spherical in nature but transformed into planar coordinates. VR content 505 has a horizontal resolution 501 and a vertical resolution 502. If VR content 505 is 4K resolution then horizontal resolution 501 is approximately 4096 pixels and vertical resolution 502 is approximately 2160 pixels.

FIGS. 5B and 5C depicts the partition module 412 partitioning the VR content 505 of FIG. 5A, to become VR content 506. VR content 506 is a partitioned version of VR content 505, in that if each partition of VR content 506 is removed then VR content 506 and VR content 505 are identical. That is, VR content 505 and VR content 506 contain the same VR content, at the same resolution; however, VR content 506 is partitioned whereas VR content 505 is the original VR content. VR content 506 and VR content 505 have the same horizontal resolution 501 and a vertical resolution 502.

Partition module 412 partitioning the VR content 506 into eight overlapping partitions segments. Each of the eight overlapping partitions segments represents a specific FOV of the VR content 506. VR content 506 is vertically partitioned into eight overlapping segments, where each segment is denoted as segment 520, 521, 522, 523, 524, 525, 526, and 527. Each segment represents a 135° view, of the 360° content, that overlaps the previous segment by 45°, and the next segment by 45°. Each segment is separated by partition lines 530, 531, 532, 533, 534, 535, 536, and 537. Partition lines 530, 531, 532, 533, 534, 535, 536, and 537 form individual portions, 510, 511, 512, 513, 514, 515, 516, and 517. Each portion (such as portion 510, 511, 512, 513, 514, 515, 516, and 517) is a 45° portion of the VR content 506. Portion 510, 511, 512, 513, 514, 515, 516, and 517 when combined is the VR content 505 of FIG. 5A.

Portion 510 encompasses 0° to 45° of the VR content 506. Portion 511 encompasses 45° to 90° of the VR content 506. Portion 512 encompasses 90° to 135° of the VR content 506. Portion 513 encompasses 135° to 180° of the VR content 506. Portion 514 encompasses 180° to 225° of the VR content 506. Portion 515 encompasses 225° to 270° of the VR content 506. Portion 516 encompasses 217° to 315° of the VR content 506. Portion 517 encompasses 315° to 360° of the VR content 506.

The partition line 530 separates segment 520 and segment 525. The partition line 531 separates segment 521 and segment 526. The partition line 532 separates segment 522 and segment 527. The partition line 533 separates segment 520 and segment 523. The partition line 534 separates segment 521 and segment 524. The partition line 535 separates segment 522 and segment 525. The partition line 536 separates segment 523 and segment 526. The partition line 537 separates segment 524 and segment 527. Each segment covers 135° of the horizontal FOV, and overlaps each adjacent portion 45°. Each package is transmitted includes a single segment. Therefore the user receives 135° FOV of high resolution VR content per transmitted package.

The partition line 530 also separates portion 510 from portion 517. The partition line 531 also separates portion 510 from portion 511. The partition line 532 also separates portion 511 from portion 512. The partition line 533 also separates portion 512 from portion 513. The partition line 534 also separates portion 513 from portion 514. The partition line 535 also separates portion 514 from portion 515. The partition line 536 also separates portion 515 from portion 516. The partition line 537 also separates portion 516 from portion 517.

Segment 520 includes portion 510, 511, and 512, and covers from 0° to 135°. Segment 521 includes portion 512, 512, and 513, and covers from 45° to 180°. Segment 522 includes portion 512, 513, and 514, and covers from 90° to 255°. Segment 523 includes portion 513, 514, and 515, and covers from 135° to 270°. Segment 524 includes portion 514, 515, and 516, and covers from 180° to 315°. Segment 525 includes portion 515, 516, and 517, and covers from 225° to 360°. Segment 526 includes portion 516, 517, and 510, and covers from 270° to 45°. Segment 527 includes portion 517, 510, and 511, and covers from 315° to 90°. It is noted that segments 526 and 527 wrap around the VR content 506 in order to overlap the previous and subsequent portions.

Each segment 520, 521, 522, 523, 524, 525, 526, and 527, is the overlapping high resolution FOV of the VR content 506 that is packaged and transmitted based on the current viewport of a user when viewing the VR content on the HMD 420. In certain embodiments, an ERP is converted into the 8 segments, each of which covers part of the VR content in high resolution. Each segment 520-527 covers 135° with shifts between two partition lines 45°. Stated differently, each segment 520-527 has an azimuth range that is extract from the VR content 506. Each segment 520-527 includes a portion that overlaps an adjacent segment. For example, each segment 520-527 has a 135° azimuth range, and adjacent segments are separated from each other by a 45° yaw offset.

Figure 6:
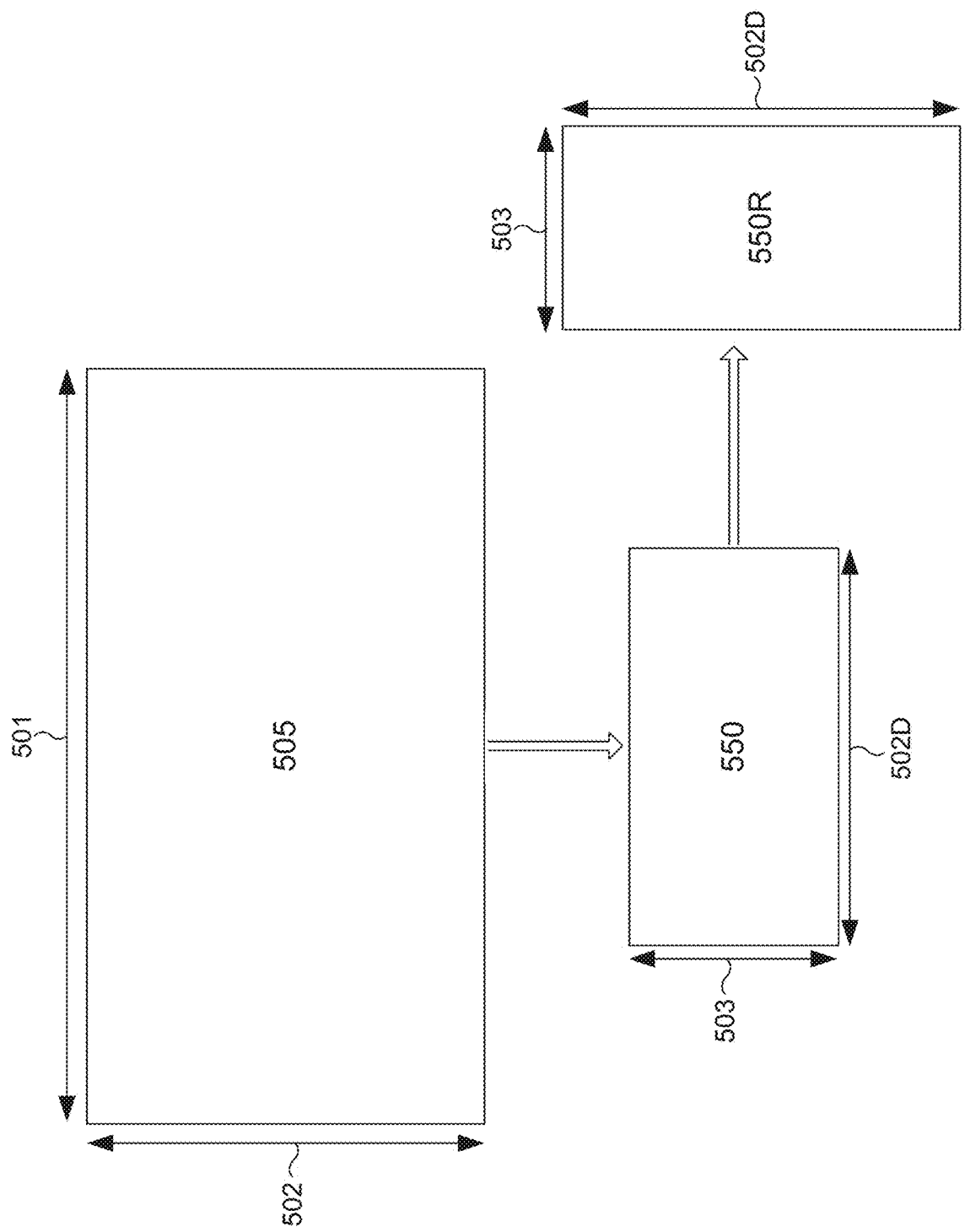
FIG. 6 illustrates an example for creating low resolution VR content in accordance with an embodiment of this disclosure.

FIG. 6 illustrates an example for creating low resolution VR content in accordance with an embodiment of this disclosure. For example, FIG. 6 illustrates down-sampling the high resolution VR content 505 of FIG. 5A, by down-sampling module 414 of FIG. 4. The embodiment and depictions of FIG. 6 is for illustration only. Other embodiments could be used without departing from the scope of the present disclosure.

Down-sampling module 414 of FIG. 4, scales down the VR content 505 to a lower resolution. Down sampling the VR content 505 makes the overall content smaller by lowering the sample size. Down sampling can be performed in either vertical or horizontal or both dimensions. In certain embodiments, down-sampling module 414, down samples the VR content 505 in both vertical or horizontal dimensions while maintain a similar aspect ratio to that of the aspect ratio of VR content 505. The down sampling is scaled such that the horizontal resolution 501 will yield the same or similar resolution to that of the vertical resolution 502.

Down-sampling module 414 down samples the VR content 505 and generates down-sampled VR content 550. Down-sampled VR content 550 has a horizontal resolution 502D and a vertical resolution 503. Horizontal resolution 502D of the down-sampled VR content 550 is a similar resolution to that of the vertical resolution 502 of VR content 505. For example, if the resolution of the VR content 505 is 4096×2160 (where the horizontal resolution 501 is 4096 and the vertical resolution 502 is 2160), then the horizontal resolution 502D of the down-sampled VR content 550 is 2160. The vertical resolution 503 of the down-sampled VR content 550 is scaled to maintain the same or similar aspect ratio to that of VR content 505. In another example, if the VR content 505 has a horizontal resolution 501 of 4000 pixels and the vertical resolution 502 is 2000 pixels, then the down-sampled VR content 550 is scaled such that the horizontal resolution 502D is 2000 pixels and the vertical resolution 503 is 1000 pixels.

Down-sampled VR content 550 is then rotated 90 degrees to become rotated down-sampled VR content 550R. In certain embodiments, the down-sampled VR content 550 is rotated clockwise. In certain embodiments, the down-sampled VR content 550 is rotated counter-clockwise. The rotated down-sampled VR content 550R includes the same VR content as VR content 505, but down sampled and rotated 90 degrees. It is noted that the dimensions of the rotated down-sampled VR content 550R are the same as the down-sampled VR content 550.

Figure 7A:
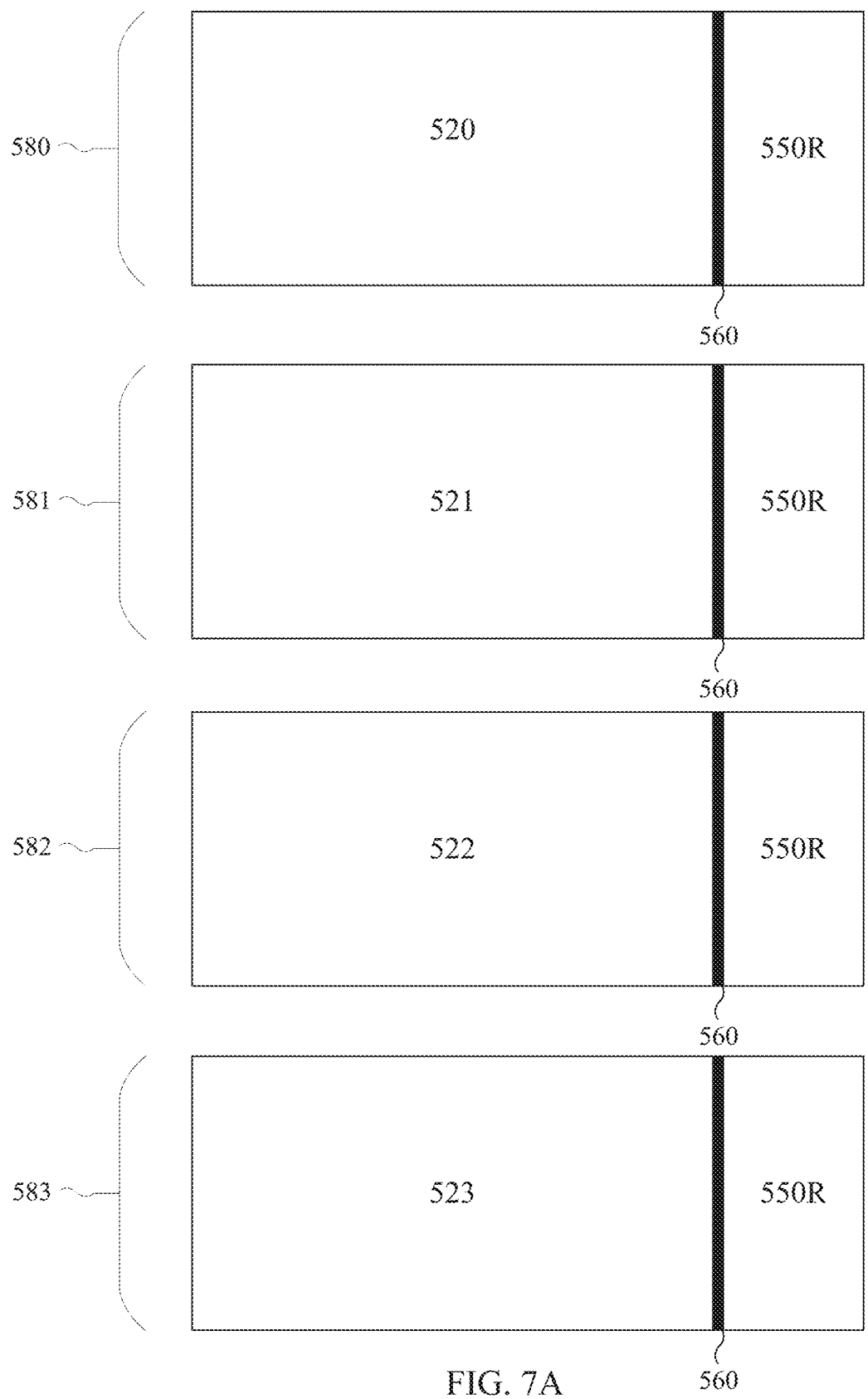
FIGS. 7A and 7B illustrates an example for packaging of the partitioning a Field-of-View VR content with the low resolution VR content in accordance with an embodiment of this disclosure.
Figure 7B:
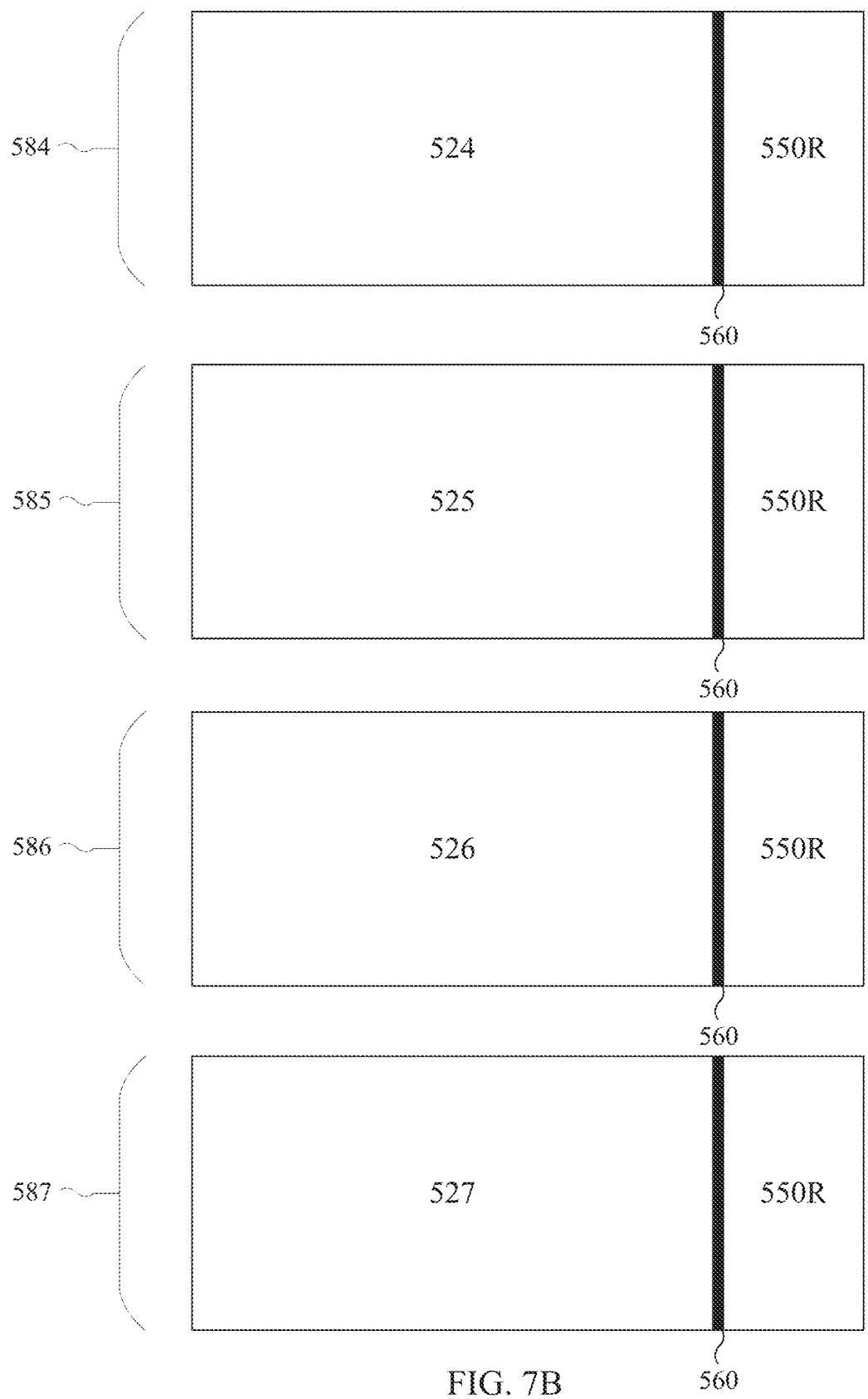

FIGS. 7A and 7B illustrates an example for packaging of the partitioning a Field-of-View VR content with the low resolution VR content in accordance with an embodiment of this disclosure. For example, FIGS. 7A and 7B illustrate that packaging of each high resolution FOV segment as depicted in FIGS. 5B and 5C with the rotated down-sampled VR content 550R of FIG. 6. In certain embodiments, the packaging of each FOV segment with the rotated down-sampled VR content 550R is performed by the packaging program 416 of FIG. 4. The embodiment and depictions of FIGS. 7A and 7B are for illustration only. Other embodiments could be used without departing from the scope of the present disclosure.

In certain embodiments, packaging program 416 combines each of the partitioned segments of the high resolution VR content 506 with the spatially down sampled VR content 550. The down sampled VR content 550 cover the entire 360° or wide view video while each of the partitioned segments covers only 135° of the high resolution VR content 505. After the down sampled VR content 550 is rotated 90°, the rotated down-sampled VR content 550R is packaged with each of the overlapped high resolution segments in one video that represents a portion of the view field and is usable for the FOV streaming. For example, each of the overlapped high resolution segments is combined with the rotated down-sampled VR content 550R into one FOV video frame. The FOV video frame can also be referred to as a viewing direction oriented video frame, as each packaged frame has a limited high resolution field of view. Each package is a single FOV of the high quality VR content, coupled with the down-sampled VR content representing the whole video. Packaging each high resolution segment with the rotated down-sampled VR content 550R creates multiple frame packed VR content, that provide for certain viewing direction and orientation to be viewed by a user on a display device.

Packaging program 416 can create 8 individual packages denoted as package 580, 581, 582, 583, 584, 585, 586, and 587. Each package can be distinguished based on an index value ranging from 0 to 7. For example, package 580 is index 0, package 581 is index 1, package 582 is index 2, package 583 is index 3, package 584 is index 4, package 585 is index 5, package 586 is index 6, and package 587 is index 7.

Package 580 combines the high resolution FOV segment 520 with the rotated down sampled VR content 550R. In certain embodiments, a guard band 560 is be included to separate the segment 520 from the rotated down sampled VR content 550R. Package 580 is a high resolution viewing direction of 0° to 135° of the VR content 505.

Package 581 combines the high resolution FOV segment 521 with the rotated down sampled VR content 550R. In certain embodiments, a guard band 560 is be included to separate the segment 521 from the rotated down sampled VR content 550R. Package 581 is a high resolution viewing direction of 45° to 180° of the VR content 505.

Package 582 combines the high resolution FOV segment 522 with the rotated down sampled VR content 550R. In certain embodiments, a guard band 560 is be included to separate the segment 522 from the rotated down sampled VR content 550R. Package 582 is a high resolution viewing direction of 90° to 255° of the VR content 505.

Package 583 combines the high resolution FOV segment 523 with the rotated down sampled VR content 550R. In certain embodiments, a guard band 560 is be included to separate the segment 523 from the rotated down sampled VR content 550R. Package 583 is a high resolution viewing direction of 135° to 270° of the VR content 505.

Package 584 combines the high resolution FOV segment 524 with the rotated down sampled VR content 550R. In certain embodiments, a guard band 560 is be included to separate the segment 524 from the rotated down sampled VR content 550R. Package 584 is a high resolution viewing direction of 180° to 315° of the VR content 505.

Package 585 combines the high resolution FOV segment 525 with the rotated down sampled VR content 550R. In certain embodiments, a guard band 560 is be included to separate the segment 525 from the rotated down sampled VR content 550R. Package 585 is a high resolution viewing direction of 225° to 360° of the VR content 505.

Package 586 combines the high resolution FOV segment 526 with the rotated down sampled VR content 550R. In certain embodiments, a guard band 560 is be included to separate the segment 526 from the rotated down sampled VR content 550R. Package 586 is a high resolution viewing direction of 270° to 45° of the VR content 505.

Package 587 combines the high resolution FOV segment 527 with the rotated down sampled VR content 550R. In certain embodiments, a guard band 560 is be included to separate the segment 527 from the rotated down sampled VR content 550R. Package 587 is a high resolution viewing direction of 315° to 90° of the VR content 505.

Each package 580-587 can be transmitted individually in response to a received request from a display device. The received request can indicate a specific index associated with a specific package, a specific FOV, or a specific field of view range. For example, if a specific index associated with a specific package is requested, then the server 410 transmits the requested package.

In another example, if a specific FOV or FOV range is requested, server 410 can determine a particular package to transmit based on the requested FOV. For instance, server 410 receives a request for FOV corresponding to 190° of the VR content, then server 410 can determine to transmit package 582, 583, or 584. Package 582 includes segment 522 that includes a FOV range of 90° to 255°. Package 583 includes segment 523 that includes a FOV range of 135° to 270°. Package 584 includes segment 524 that includes a FOV range of 180° to 315°. In certain embodiments, server 410 identifies a particular package to transmit based on the current viewport. In identifying a particular package to transmit, the server 410 can select a package that includes a FOV range that covers within a threshold the requested FOV. After selecting a package the server 410 transmits the package to the requesting device such as HMD 420.

Each package 580-587 contains both a high resolution FOV segment as the down-sampled VR content 550R. Therefore, when high resolution FOV segment is displayed on a display, and the current viewport reaches a threshold or exceeds to FOV associated with the high resolution segment, then the display renders and displays the down-sampled VR content 550R while requesting another package that includes the current viewport of the user. For example, the threshold can be the margins of the high resolution FOV segment such as 0° to 135° (package 580) or a predetermined number of degrees within the FOV range.

In certain embodiments, each package 580-587 are pre-packaged by and stored in an information repository, until a request for a particular package is received. In certain embodiments, the server packages each package on demand based on each request. For example, the server can maintain the down sampled VR content 550 and each segment 520-527 in an information repository combine the particular VR segment with the down sampled VR content 550 as needed. In another example the server can on demand, partition the VR content 505 and perform the down-sampling per each request as needed.

When a display device, such as HMD 420, receives a package such as package 580-587, the display device first decodes the package and renders and displays the received high resolution FOV content. The decoding process separates the high resolution segment (such as segment 520-527) from the down-sampled VR content 550. The decoding process can also rotate the down-sampled VR content 550. In another example the shader of the rendering process can separate the high resolution segment (such as segment 520-527) from the down-sampled VR content 550 as well as rotate the down-sampled VR content 550. In certain embodiments, if guard band is signaled as part of the content, then the location of the guard band is known by the renderer. For example, the renderer can receive a message indicating the location of the signaled guard band.

When a display device, such as HMD 420, receives a package such as package 580-587, the display device displays the rendered content to the user. The display device tracks the users head movements and displays content associated with the current viewport of the user. That is, in response to the head of the user turning 1° to the left, then the displayed VR content is shifted in response to the movement. When the user reaches a threshold of the FOV content of the received package (such as package 584), then the display renders and displays low resolution of the down sampled VR content 550. The display also requests a package corresponding to the current viewport of the user, such as package 583 or 584, if the current viewport is within the FOV range of the package.

Figure 8A:
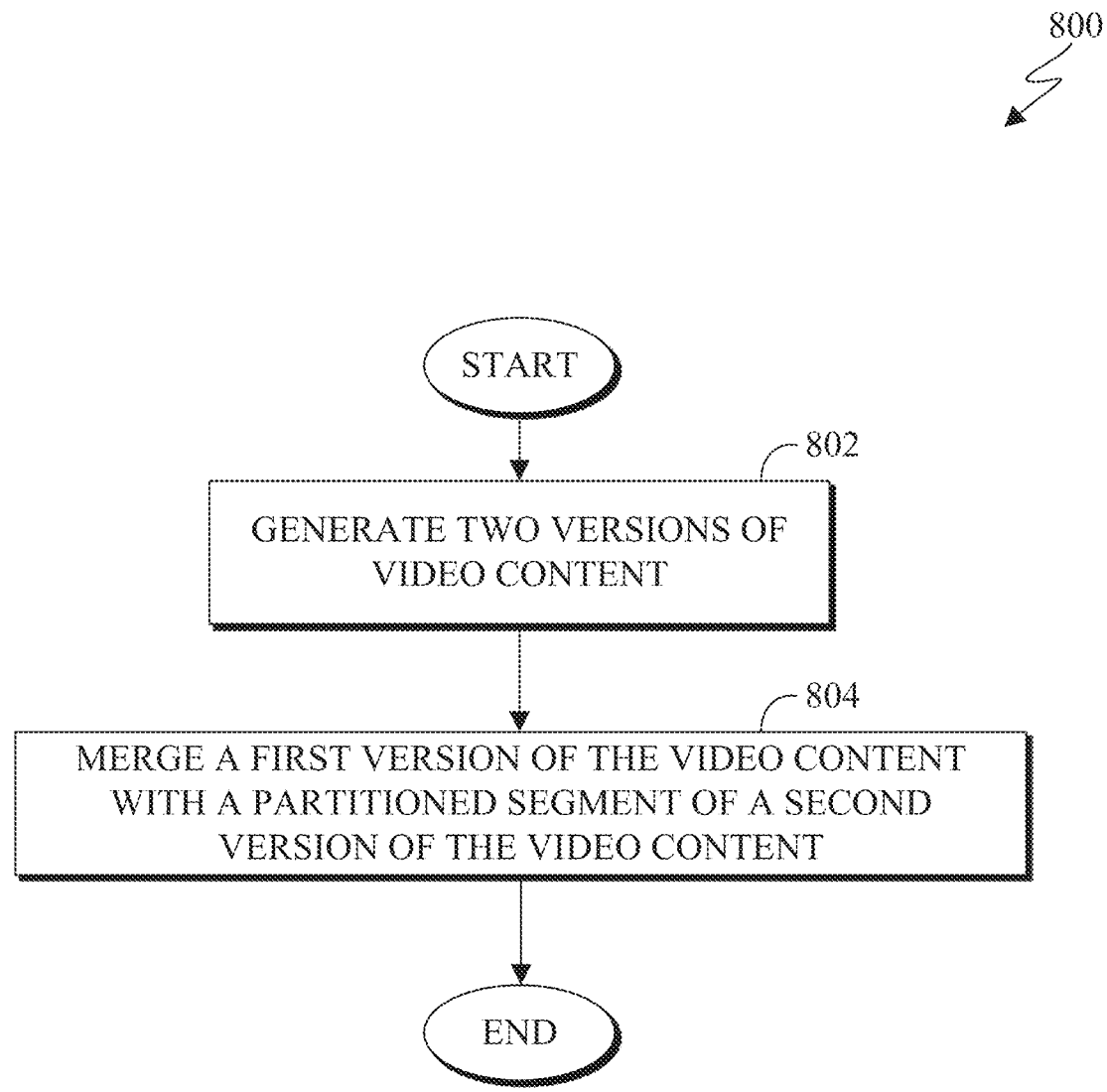
FIG. 8A illustrates an example flowchart for packaging VR content in accordance with an embodiment of this disclosure.

FIG. 8A illustrates an example flowchart for packaging VR content in accordance with an embodiment of this disclosure. FIG. 8A depicts flowchart 800, for packaging VR content accordance with an embodiment of this disclosure. For example, the process depicted in FIG. 8A is described as implemented by the server 200, in FIG. 2, or server 410, with respect to electronic device such as any one of the client devices 106-115, or HMD 420.

The process begins with server 410 generate two versions of video content (802). The first version is a low resolution version of the video content. In certain embodiments, the video content is an equirectangular projection (ERP) of a 360° scene. In certain embodiments, a video content is of a 360° video or a wide angle video is partitioned.

The process generates the first version by reducing or down-sampling the resolution of the video content. In certain embodiments, the horizontal and vertical resolution of the video content by half. In certain embodiments, the process scales the first version such that a horizontal resolution of the first version is similar to a vertical resolution of the second version. Therefore when the first version is rotated 90 degrees (once rotated the horizontal resolution becomes the vertical resolution), the vertical resolution of the first version is similar to the vertical resolution of the second version.

The process generates the second version is the video content by partitioning the content into a plurality of overlapping video segments. In certain embodiments, the second version partitions the video content into a plurality of 135 degree overlapping segments. In certain embodiments, each segment is offset from an adjacent segment by 45 degrees. In certain embodiments, the process provides a 135 degrees azimuth range for each segment, while each segment is offset by 45 degrees yaw offset. This provides that the second version is partitioned into eight overlapping segments.

The process then merges the first version with a segment of the second version into a single package (804). When the first version is merged with a segment of the second version, the first version is rotated 90 degrees. For example, the process can generate eight individual packages, where each package includes a different high resolution FOV content.

In certain embodiments, the process can encode each package. For example, each package can be encoded with an advanced video coding (AVC). In another example, each package can be encoded with a high efficiency video coding (HEVC).

In certain embodiments, the process can generate a guard band. For example, the guard band separates a the first version and the segment of the second version in each package.

Figure 8B:
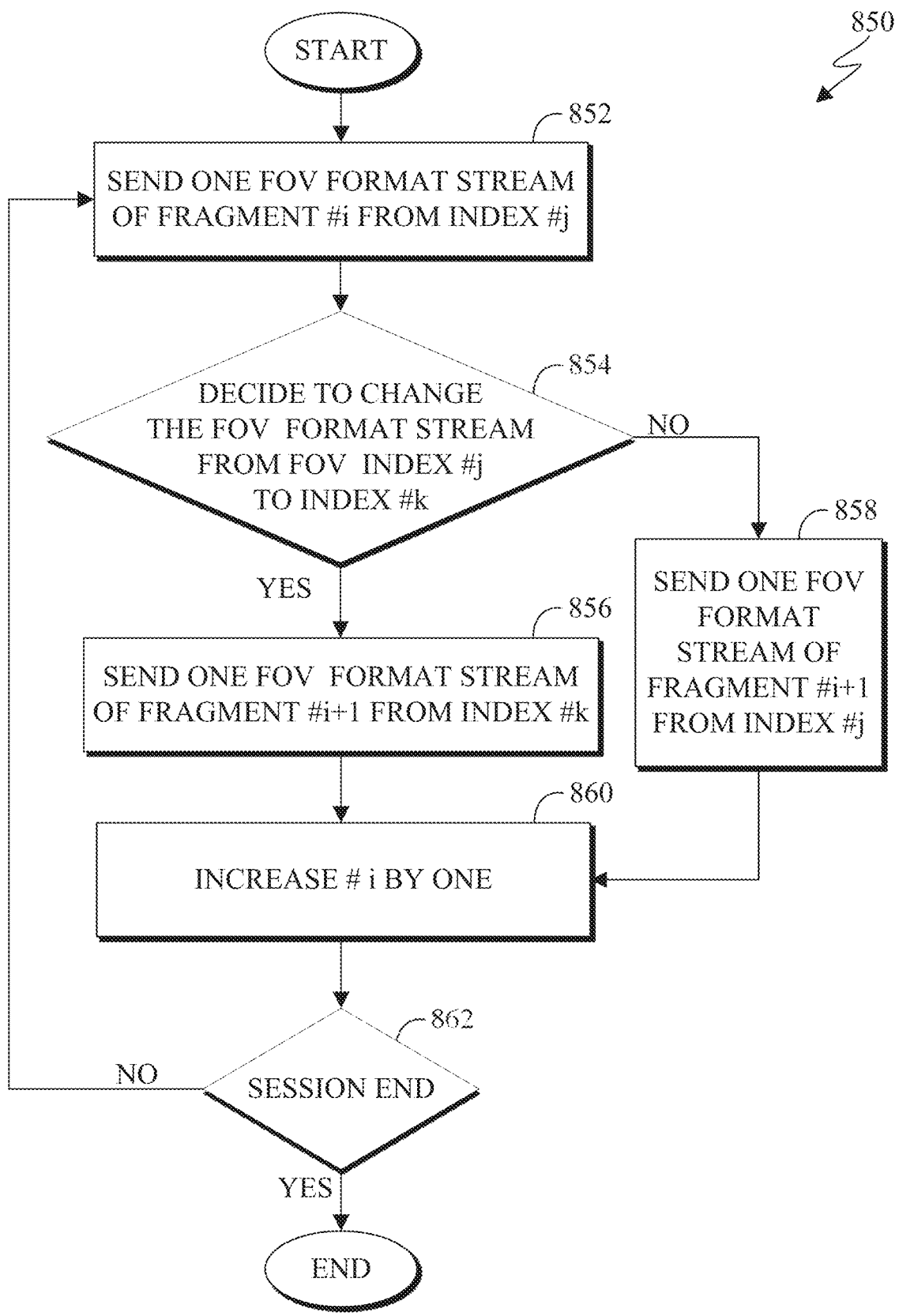
FIG. 8B illustrates an example flowchart for sending a single field-of-view VR stream in accordance with an embodiment of this disclosure.

FIG. 8B illustrates an example flowchart for sending a single field-of-view VR stream in accordance with an embodiment of this disclosure. FIG. 8B depicts flowchart 850, for transmitting and streaming VR content accordance with an embodiment of this disclosure. For example, the process depicted in FIG. 8B is described as implemented by the server 200, in FIG. 2, or server 410, with respect to electronic device such as any one of the client devices 106-115, or HMD 420.

The process begins with the server 410 streaming to a display device a FOV segment #i from an index #j (852). For example, the server 410 sends a particular package, such as package 580 (with a corresponding index 0) to a display device. The package 580 is streamed from server 410 to the display device. Package 580 includes FOV ranging from 0° to 135° of the 360° VR content 505. When the package 580 is streamed to the display device, fragment #i represents a specific portion of content ranging from 0° to 135°, such as 112°. Fragment #i corresponds to the current viewport that is viewed by the user.

The process then determines whether the FOV stream needs to change from index #j to index #k based on a user's head movement (854). That is, if a user moves their head the process determines whether the detected movement changes the field of view enough, such that a new package is required to display the high resolution FOV. If it is determined that a new package is required, then the process sends a FOV stream of fragment #i+1 from index #k (856). Index #k can be any index such as index 1-7 corresponding to package 581-587, respectively. For example, if the head of the user moves enough such that the threshold is reached that indicates that a new package is needed. Then the process sends data from a different package, such as package 581 through 587, depending on the direction of the movement of the user's head. In certain embodiments, when the process switches from index #j to index #k, a low resolution fragment is rendered and displayed on the display device.

If it is determined that a new package is not required, such that the current viewport is within the current package, then the next fragment is transmitted, such as fragment #i+1. (858). For example, if the index #k is index 0 corresponding to package 580, then the FOV includes 0° to 135°. The fragment #i is the current viewport of the user. For instance, when the head of the user is moved from 112° to 111°, the process sends a new fragment, #i+1.

The process continues and streams fragment #i+1 from the respective index and for each movement of the head of the user the fragment is increased by one (860). The process then determines whether the streaming session is to end (862). If the process continually repeats until the streaming session ends.

Figure 9A:
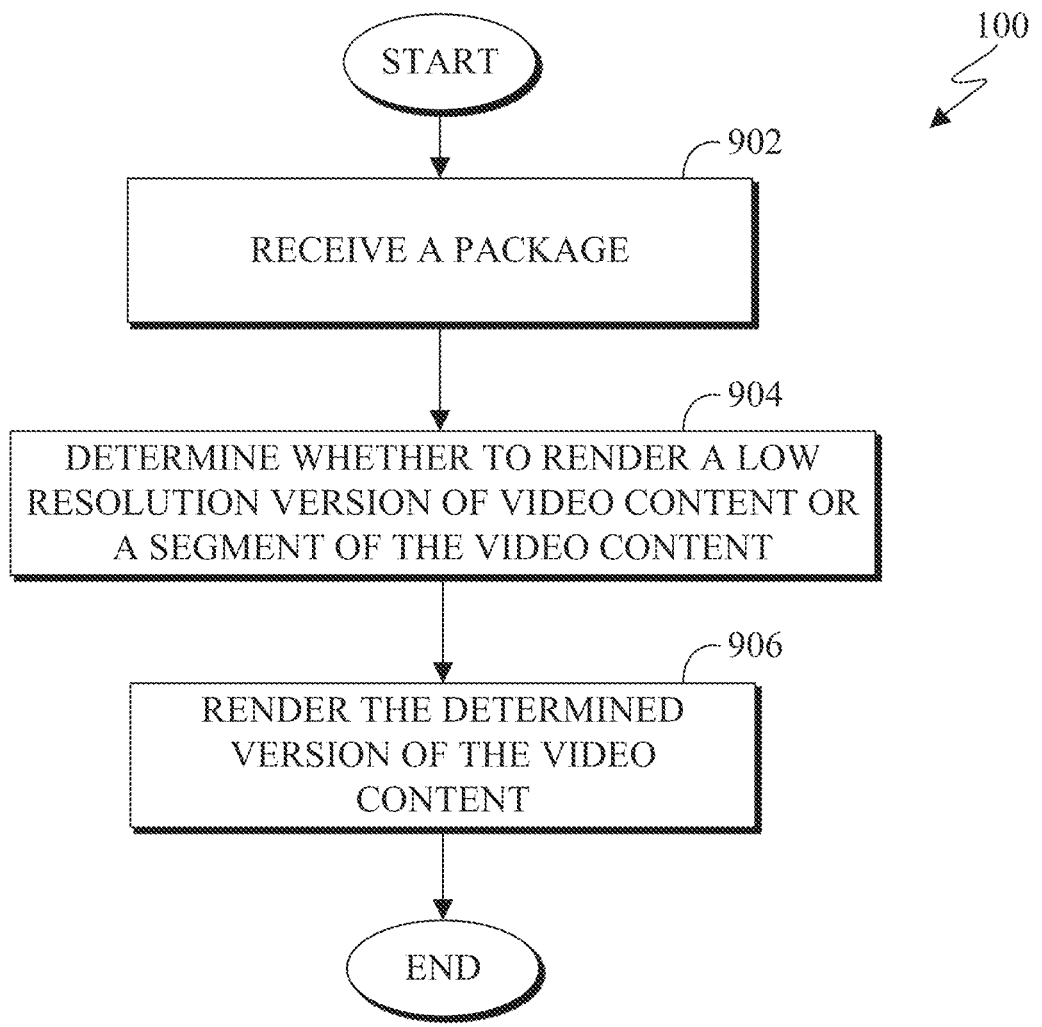
FIG. 9A illustrates an example flowchart for rendering the packaged VR content in accordance with an embodiment of this disclosure.

FIG. 9A illustrates an example flowchart 900 for rendering the packaged VR content in accordance with an embodiment of this disclosure. For example, the process depicted in FIG. 9A is described as implemented by one/or more client device such as any one of the client devices 106-115 in FIG. 1, electronic device 300, in FIG. 3, or HMD 420 in FIG. 4.

The process begins with display device, such as HMD 420 receiving a package from a server, such as server 410. (902). The received package includes a low resolution version of video content and a segment of the video content. In certain embodiments, the segment a resolution version of video content limited 135° FOV of a 360° omnidirectional video, whereas the low is the entire video content. That is each segment of the plurality of overlapping video segments can be 135 degree portion of the video content and is offset by an adjacent segment by 45 degrees. In certain embodiments, the display device can receive one of eight packages.

Upon receiving the package, the process determines whether to render the low resolution version of video content or the segment of the video content (904). In order to determine whether to render the low resolution version of video content or the segment of the video content the process prioritizes the first version and the second version dependent on the viewport. For example, when a viewport corresponds to the segment, the process prioritizes the segment of the video content over the low resolution version of video content. In another example, when the viewport corresponds to content not within the segment, the process prioritizes the low resolution version of video content over the segment of the video content. That is, based on a current viewport of the content on the electronic device, the process can determine whether to render the segment or the low resolution version.

Thereafter the process renders the determined version of the video content (906). In order to render the determined version of the video content the process separates the low resolution version of video content and the segment of the video content. The process can then rotate the low resolution version of the video content by 90 degrees.

The process renders and displays the segment if the current viewport of the user is directed at the content within the 135° FOV. When the head of the user moves, the current viewport is adjusted based on the magnitude of the movement. Therefore when the head of the user moves to a threshold or beyond the FOV, the process can switch from the segment to the low resolution version. The determination to switch from rendering the segment to the low resolution version can be based on a threshold. In certain embodiments, the threshold can be located at the margin of the segment. For example, if the received package is package 580, the margin is at 0° and 135°. Therefore if the current viewport of the user reaches either 0° or 135°, then the process switches to the low resolution video and renders and displays the content at the current at the viewport of the user. In certain embodiments, the threshold is a predetermined distance from the margin of the high resolution video. The threshold can be any location between the FOV range. For example, the threshold could be set up at 25° from the margin. If the received package is package 580 with margin at 0° and 135°, then the threshold is established at 25° and 105°, yielding a FOV of from 25° to 105°. Therefore, if the current viewport of the user reaches either 25° or 105°, then the process switches to the low resolution video and renders and displays the content at the current at the viewport of the user.

Figure 9B:
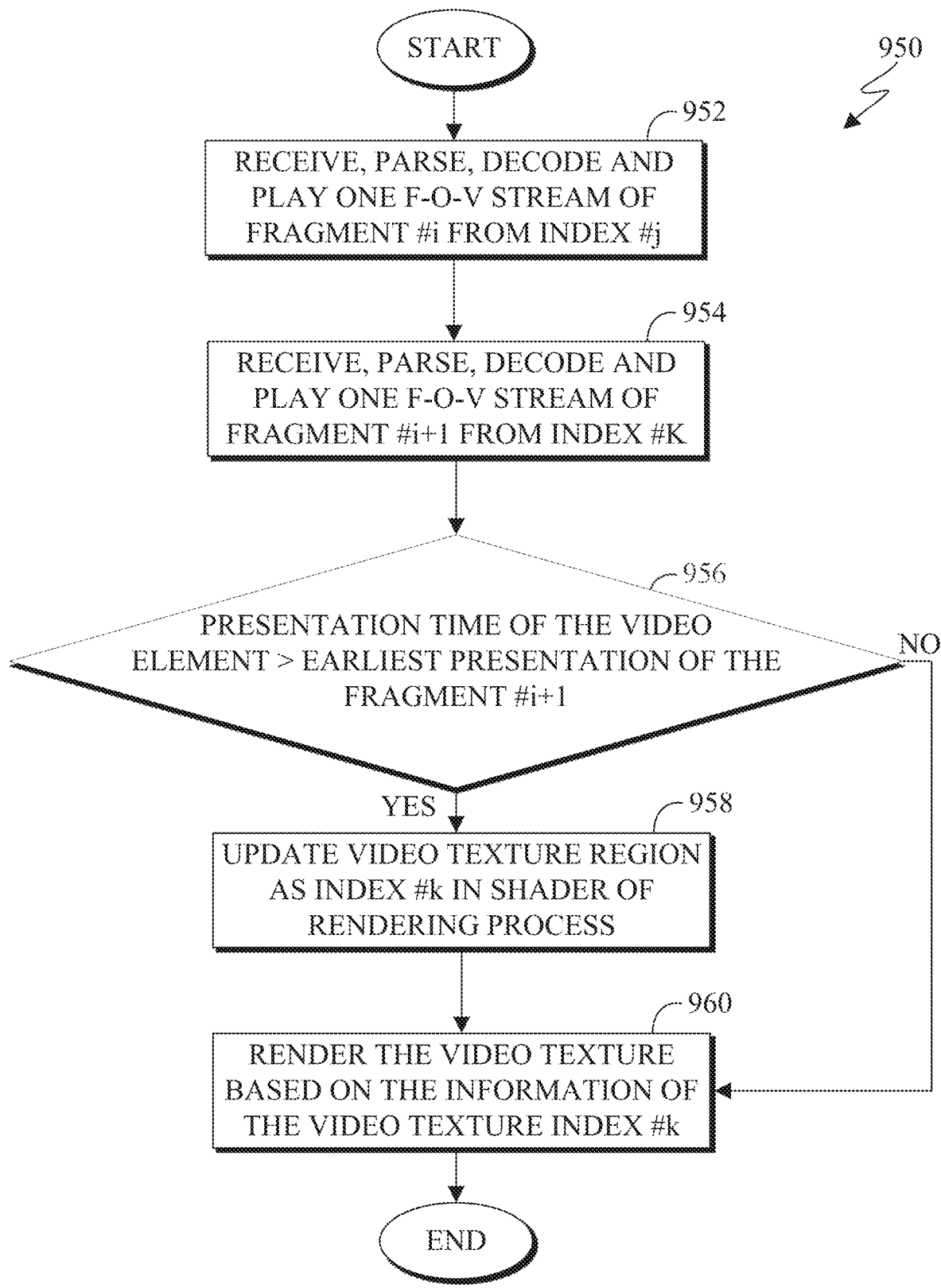
FIG. 9B illustrates an example flowchart for receiving a Field-of-View VR stream in accordance with an embodiment of this disclosure.

FIG. 9B illustrates an example flowchart 950 for receiving a FOV stream in accordance with an embodiment of this disclosure. Flowchart 950 illustrates a display device, such as HMD 420 receiving, rendering, and decoding a single FOV content. For example, the process depicted in FIG. 9A is described as implemented by one/or more client device such as any one of the client devices 106-115 in FIG. 1, electronic device 300, in FIG. 3, or HMD 420 in FIG. 4.

The process begins with a display device, such as HMD 420, receiving a FOV stream (952). The FOV stream is of fragment #i from index #j. The received fragment #i is streamed from a server, such as server 410. The received FOV stream is parsed, decoded, and played on the display. The index #j is a package corresponding to package 580-587 with an index value of 0-7, respectively.

The process continues and receives a FOV stream of fragment #i+1 from index #k (954). The fragment #i+1 corresponds to the current viewport of the user. The fragment #i+1 is from a different index than fragment #i. For example, the current viewport of the user changing such that the index #j either reached a threshold or did not include the FOV of the current viewport of the user. The received FOV stream of fragment #i+1 is parsed, decoded, and played on the display.

The process then determines whether the presentation time of the video element is larger than or equal to the earliest presentation of the fragment #i+1 (956). If the presentation time of the video element is equal to or larger than the earliest presentation of the fragment #i+1, then the process updates the video texture region as index #k in shader of the rendering process (958). When the process updates the video texture region or the presentation time of the video element is smaller than the earliest presentation of the fragment #i+1, then the process renders the video texture based on information of the video texture index from index #k (960).

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for consuming video content, the electronic device comprising:
   a sensor;
   a processor operably connected to the sensor, the processor configured to determine a current viewport for the video content based on an output of the sensor; and
   a transceiver operably connected to the processor, the transceiver configured to request and receive a media stream comprising a plurality of frames, wherein at least one of the plurality of frames includes (i) a high-resolution video partition of the video content that covers a portion of the video content corresponding to the current viewport and (ii) a low-resolution version of the video content including the portion of the video content corresponding to the current viewport,
   wherein the high-resolution video partition is oriented in a first direction in the at least one frame while the low-resolution version of the video content is rotated and oriented perpendicular to the first direction of the high-resolution video partition,
   wherein the processor is further configured to process the media stream to render at least one of the high-resolution video partition of the video content or the low-resolution version of the video content,
   where while the current viewport is within a viewing range of the high-resolution video partition of the video content, the processor is configured to render the high-resolution video partition of the video content, and
   wherein after determining, based on the output from the sensor, that the current viewport has changed and is not within the viewing range of the high-resolution video partition, the processor is configured to:
      request and receive, via the transceiver, and decode a second media stream that includes a different high-resolution partition that corresponds to the changed current viewport, and
      render the low-resolution version of the video content while the second media stream is being requested, received, and decoded.

2. The electronic device of claim 1, wherein the processor is configured to detect that the low-resolution version of the video content is rotated by a predefined degree and packed together with the high-resolution video partition to produce a 2D rectangular video.

3. The electronic device of claim 1, wherein the high-resolution video partition of the video content is one of a plurality of overlapping high-resolution video partitions generated from a high-resolution version of the video content.

4. The electronic device of claim 3, further comprising a display configured to display the video content of the media stream, and wherein:
the video content is an equirectangular projection of a 360 degree scene;
the plurality of overlapping high-resolution video partitions each cover a first predefined degree in width of the video content; and
each of the plurality of overlapping high-resolution video partitions are shifted from an adjacent partition of the plurality of overlapping high-resolution video partitions by a second predefined degree wherein the second predefined degree is equal to the first predefined degree minus a portion of the displayed video content on the display of the electronic device.

5. The electronic device of claim 3, wherein:
each frame of the plurality of frames includes a different one of the plurality of overlapping high-resolution video partitions and the low-resolution version of the video content packed together; and
the media stream includes a guard band that separates the high-resolution video partition and the low-resolution version of the video content that are packed together.

6. A server for packing virtual reality content, the server comprising:
a communication interface; and
a processor operably connected to the communication interface, the processor configured to:
partition high-resolution video content into a plurality of overlapping high-resolution video partitions, each of the plurality of overlapping high-resolution video partitions covers a viewport for the video content;
generate a low-resolution version of the video content that includes a portion of the video content corresponding to the viewport and is rotated relative to the plurality of overlapping high-resolution video partitions;
generate a media stream by packing, in a frame of the media stream, one high-resolution video partition, of the plurality of overlapping high-resolution video partitions, oriented in a first direction and the rotated low-resolution version of the video content that is oriented perpendicular with respect to the first direction;
transmit, via the communication interface, the media stream to an electronic device, wherein the electronic device renders the one high-resolution video partition; and
receive, via the communication interface from an electronic device, a request for a second media stream that includes a different high-resolution partition that corresponds to a changed viewport, wherein the low-resolution version of the video content is rendered until the second media stream is decoded.

7. The server of claim 6, wherein to partition the high-resolution video content into the plurality of overlapping high-resolution video partitions, the processor is configured to partition the plurality of overlapping high-resolution video partitions to each cover a predefined degree width of the high-resolution video content.

8. The server of claim 6, wherein to partition the high-resolution video content into the plurality of overlapping high-resolution video partitions, the processor is configured to shift each adjacent partition by a predefined degree.

9. The server of claim 6, wherein:
the communication interface is configured to transmit the media stream to an electronic device in response to receiving a request for a partition of the high-resolution video content, and
to generate the media stream, the processor is configured to select the low-resolution version of the video content and the one high-resolution video partition based on the request, wherein the low-resolution version of the video content comprises the video content and the one high-resolution video partition covers a determined viewport of the video content.

10. The server of claim 6, wherein to generate the low-resolution version of the video content, the processor is configured to down-sample the high-resolution video content such that a horizontal and vertical resolution of the low-resolution version is a down-sampled version of the high-resolution video content.

11. The server of claim 6, wherein to generate the low-resolution version, the processor is configured to rotate the low-resolution version of the video content by 90 degrees and pack the one of the plurality of overlapping high-resolution video partitions to the rotated low-resolution version of the video content.

12. The server of claim 6, wherein the processor is further configured to:
encode the media stream with at least one of an advanced video coding (AVC) or high efficiency video coding (HEVC), and
generate a guard band, wherein the guard band separates the one high-resolution video partition and the rotated low-resolution version of the video content when they are packed together.

13. The server of claim 6, wherein the video content is an equirectangular projection of a 360 degree scene.

14. A method for consuming video content at an electronic device, the method comprising:
determining a current viewport for the video content based on an output of a sensor of the electronic device;
requesting and receiving a media stream comprising a plurality of frames, wherein at least one of the plurality of frames includes (i) a high-resolution video partition of the video content that covers a portion of the video content corresponding to the current viewport and (ii) a low-resolution version of the video content including the portion of the video content corresponding to the current viewport, wherein the high-resolution video partition is oriented in a first direction in the at least one frame while the low-resolution version of the video content is rotated and oriented perpendicular to the first direction of the high-resolution video partition;
processing the media stream to render at least one of the high-resolution video partition of the video content or the low-resolution version of the video content;
determining, based on the output from the sensor, whether the current viewport is within a viewing range of the high-resolution video partition of the video content;
while the current viewport is within the viewing range of the high-resolution video partition of the video content, rendering the high-resolution video partition of the video content; and in response to determining that the current viewport has changed and is not within the viewing range of the high-resolution video partition:
    requesting, receiving, and decoding a second media stream that includes a different high-resolution partition that corresponds to the changed current viewport, and
    rendering the low-resolution version of the video content while the second media stream is being requested, received, and decoded.

15. The method of claim 14, wherein the high-resolution video partition of the video content is one of a plurality of overlapping high-resolution video partitions generated from a high-resolution version of the video content.

16. The method of claim 15, wherein:
    the video content is an equirectangular projection of a 360 degree scene;
    the plurality of overlapping high-resolution video partitions each cover a first predefined degree width of the video content; and
    each of the plurality of overlapping high-resolution video partitions are shifted from an adjacent partition of the plurality of overlapping high-resolution video partitions by a second predefined degree wherein the second predefined degree is equal to the first predefined degree width minus a portion of displayed video content.

17. The method of claim 15, wherein:
    each frame of the plurality of frames includes a different one of the plurality of overlapping high-resolution video partitions and the rotated low-resolution version of the video content that are packed together; and
    the media stream includes a guard band that separates the high-resolution video partition and the rotated low-resolution version of the video content that are packed together.

18. The method of claim 14, further comprises detecting that the low-resolution version of the video content is rotated by a predefined degree and packed together with the high-resolution video partition to produce a 2D rectangular video.

* * * * *